United States Patent
Atsumi et al.

(10) Patent No.: US 10,605,971 B2
(45) Date of Patent: Mar. 31, 2020

(54) OPTICAL ELEMENT, METHOD OF MANUFACTURING OPTICAL ELEMENT, AND LIQUID CRYSTAL DISPLAY DEVICE

(71) Applicant: FUJIFILM Corporation, Tokyo (JP)

(72) Inventors: Kunihiro Atsumi, Kanagawa (JP); Yukito Saitoh, Kanagawa (JP); Katsufumi Ohmuro, Kanagawa (JP); Jun Takeda, Kanagawa (JP); Shinichi Morishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/894,449

(22) Filed: Feb. 12, 2018

(65) Prior Publication Data

US 2018/0164481 A1 Jun. 14, 2018

Related U.S. Application Data

(63) Continuation of application No. PCT/JP2016/003883, filed on Aug. 26, 2016.

(30) Foreign Application Priority Data

Aug. 27, 2015 (JP) .................. 2015-168058
Jul. 15, 2016 (JP) .................. 2016-139987

(51) Int. Cl.
*G02F 1/13363* (2006.01)
*G02F 1/1335* (2006.01)
*G02B 5/30* (2006.01)

(52) U.S. Cl.
CPC ....... *G02B 5/3016* (2013.01); *G02F 1/13363* (2013.01); *G02F 1/133536* (2013.01);
(Continued)

(58) Field of Classification Search
CPC ............... G02F 1/133536; G02F 2001/133631
See application file for complete search history.

(56) References Cited

U.S. PATENT DOCUMENTS

| 6,061,108 A | 5/2000 | Anderson et al. |
|---|---|---|
| 6,175,400 B1 | 1/2001 | Duncan et al. |

(Continued)

FOREIGN PATENT DOCUMENTS

| CN | 101542364 A | 9/2009 |
|---|---|---|
| CN | 102472921 A | 5/2012 |

(Continued)

OTHER PUBLICATIONS

Notification of Reasons for Refusal issued by the Japanese Patent Office dated Oct. 2, 2018, in connection with Japanese Patent Application No. 2017-536622.

(Continued)

*Primary Examiner* — Ryan Crockett
*Assistant Examiner* — Mariam Qureshi
(74) *Attorney, Agent, or Firm* — Edwards Neils LLC; Jean C. Edwards, Esq.

(57) ABSTRACT

The present invention includes an optical element of which an oblique tint change can be improved in a case of the optical element is incorporated to a liquid crystal display device, a method of manufacturing an optical element, and a liquid crystal display device. The optical element includes: a reflection polarizer which is formed of a discotic liquid crystal compound and in which a cholesteric liquid crystalline phase is immobilized, in which, in the reflection polarizer, a front retardation value Re satisfies $0\ nm \leq Re < 10\ nm$ in a range of ±50 nm outside a reflection center wavelength, and an absolute value $|Ret\ (50°)|$ of a retardation value Ret in a polar angle 50° direction satisfies $|Ret\ (50°)| \leq 50\ nm$.

3 Claims, 3 Drawing Sheets

(52) U.S. Cl.
CPC ............ *G02F 2001/133638* (2013.01); *G02F 2413/01* (2013.01); *G02F 2413/05* (2013.01)

(56) References Cited

U.S. PATENT DOCUMENTS

| | | | |
|---|---|---|---|
| 2010/0007823 A1 | | 1/2010 | Haraguchi et al. |
| 2010/0231831 A1* | | 9/2010 | Miyatake ............ G02F 1/13363 349/96 |
| 2012/0162581 A1 | | 6/2012 | Ashida et al. |
| 2015/0277012 A1* | | 10/2015 | Nakamura ............. G02B 5/045 349/96 |
| 2016/0170114 A1 | | 6/2016 | Watano et al. |

FOREIGN PATENT DOCUMENTS

| | | |
|---|---|---|
| CN | 102749669 A | 10/2012 |
| EP | 1489437 A1 | 12/2004 |
| JP | H01133003 A | 5/1989 |
| JP | H10213709 A | 8/1998 |
| JP | H1164631 A | 3/1999 |
| JP | 2001-081465 A | 3/2001 |
| JP | 3518660 B2 | 4/2014 |
| WO | 2008/016056 A1 | 2/2008 |
| WO | 2011/030596 A1 | 3/2011 |
| WO | 2015/029958 A1 | 3/2015 |

OTHER PUBLICATIONS

International Search Report issued in PCT/JP2016/003883 dated Dec. 13, 2016.
Written Opinion issued in PCT/JP2016/003883 dated Dec. 13, 2016.
International Preliminary Report on Patentability completed by WIPO dated Feb. 27, 2018, in connection with International Patent Application No. PCT/JP2016/003883.
Petr V. Shibaev, et al. (2010) Mechanism of colour changes in stretchable cholesteric films, Liquid Crystals, 37:5, 587-592, DOI: 10.1080/02678291003710474.
Office Action, issued by the State Intellectual Property Office dated Oct. 8, 2019, in connection with Chinese Patent Application No. 201680048811.6.

* cited by examiner

OPTICAL ELEMENT, METHOD OF MANUFACTURING OPTICAL ELEMENT, AND LIQUID CRYSTAL DISPLAY DEVICE

CROSS-REFERENCE TO RELATED APPLICATIONS

This application is a continuation application of International Application No. PCT/JP2016/003883 filed Aug. 26, 2016, which was published under PCT Article 21(2) in Japanese, and which claims priority under 35 U.S.C. § 119(a) to Japanese Patent Application No. 2015-168058, filed Aug. 27, 2015 and Japanese Patent Application No. 2016-139987, filed Jul. 15, 2016. The above applications are hereby expressly incorporated by reference, in their entirety, into the present application.

BACKGROUND OF THE INVENTION

1. Field of the Invention

The present invention relates to an optical element, a method of manufacturing an optical element, and a liquid crystal display device.

2. Description of the Related Art

A flat panel display such as a liquid crystal display device (hereinafter, also referred to as LCD) has been variously used annually as a space saving image display device having low power consumption. The liquid crystal display device, for example, is configured by disposing backlight (hereinafter, also referred to as BL), a backlight-side polarizing plate, a liquid crystal cell, a visible side polarizing plate, and the like in this order.

Recently, in the flat panel display market, as LCD performance improvement, development for saving electric power consumption, high definition, and color reproducibility is in progress. These performance improvements are remarkable particularly in small size liquid crystal display devices such as tablet PCs and smart phones.

Meanwhile, with respect to a large size display for handling Television (TV) applications, the development of the next generation high definition (4K2K, EBU ratio of 100% or more) is in progress, and development for saving electric power consumption, high resolution, and color reproducibility is in progress, as performance improvements such as size reduction. Therefore, improvements on electric power consumption saving, high definition, and color reproducibility of a liquid crystal display device are increasingly required.

It has been proposed that a reflection polarizer is disposed between the backlight and the backlight-side polarizing plate according to electric power consumption saving of the backlight. The reflection polarizer is an optical element that transmits only light rays vibrating in a specific polarization direction among incident light rays vibrating in all directions and reflects light rays vibrating in the other polarization directions. Accordingly, it is possible to recycle the light rays which do not transmit the reflection polarizer but are reflected on the reflection polarizer such that the light utilization efficiency in the LCD can be improved.

As the reflection polarizer, a structure in which layers obtained by immobilizing a cholesteric liquid crystalline phase are laminated has been adopted. Since the cholesteric liquid crystalline phase exhibits circular polarizing reflection properties at a wavelength corresponding to the helical pitch, it is possible to broaden the reflection wavelength range by laminating a plurality of layers having different pitches. JP1989-133003A (JP-H01-133003A) discloses a technology of improving a light utilization rate of BL by broadening a reflection wavelength range with a reflection polarizing plate obtained by laminating a $\lambda/4$ plate and a layer obtained by immobilizing a cholesteric liquid crystalline phase and a layer obtained by immobilizing cholesteric liquid crystalline phases of three or more layers having different pitches of the cholesteric liquid crystalline phases.

Here, it has been known that, in a case where the reflection polarizing plate obtained by laminating the $\lambda/4$ plate and the layer obtained by immobilizing the cholesteric liquid crystalline phase is incorporated in the liquid crystal display device, the tint in a case of being viewed from an oblique direction which is caused by optical properties of the cholesteric liquid crystalline phase and the $\lambda/4$ plate easily changes.

In response, JP3518660B suggests a method of shortening the pitch of the cholesteric liquid crystalline phase on an incidence side of the light and a method of providing a compensation layer having a refractive index in a vertical direction which is greater than an in-plane refractive index. WO2008/016056A suggests a method of causing retardation of the $\lambda/4$ plate in a thickness direction to be less than 0.

In a case where the layer is formed by immobilizing the cholesteric liquid crystalline phase, a rod-like liquid crystal compound is generally used as a cholesteric liquid crystal material, but the reflection function like a cholesteric liquid crystalline phase can be obtained by using the rod-like liquid crystal compound which is able to be obtained by aligning a discotic (also called disk-like) liquid crystal in a helical shape. A discotic liquid crystal having a helical structure is disclosed in JP2001-81465A.

With respect to a polarizing plate using a layer obtained by immobilizing other cholesteric liquid crystalline phases, proposed is a method of providing a plurality of layers having different pitches or a method of gradually changing the pitches in order to broaden the reflection range.

Recently, a film obtained by immobilizing a cholesteric liquid crystalline phase have been applied and studied in various fields due to optical properties thereof. For example, Liquid Crystals, Vol. 37, No. 5, May 2010, p. 587 to 592 discloses that a cholesteric liquid crystal is sensitive to mechanical stress, and, in a case where a viscous composition including a cholesteric liquid crystal is stretched in a state of being interposed between two silicon films, a shift and a color change are generated in a selective reflection wavelength band.

SUMMARY OF THE INVENTION

As described above, a liquid crystal display device using a polarizing plate obtained by combining a layer obtained by immobilizing a cholesteric liquid crystalline phase and a $\lambda/4$ plate contributes to improvement on a light utilization efficiency of BL light. However, in view of improvement on electric power consumption saving, high definition, and color reproducibility in recent liquid crystal display devices, improvement on oblique tint changes at an even higher level is required. In this manner, it is desirable to develop a new member which can improve oblique tint changes in the liquid crystal display device.

The present invention has been made in view of the above circumstances, and an object of the present invention is to provide an optical element which can improve oblique tint changes in a case of being incorporated in a liquid crystal display device, a manufacturing method of an optical element, and a liquid crystal display device including the optical element.

In the liquid crystal display device, the cause of the oblique color change is that transmitted light in an oblique direction which is elliptically polarized by a phase difference due to cholesteric alignment of a liquid crystal and thus all of the light which transmit the λ/4 plate may not be converted to linearly polarized light. Generally, a refractive index ellipsoid of a liquid crystalline phase in which the alignment is immobilized is voluntarily arranged in the orientation restriction direction of a substrate, and thus is unique to a material of the liquid crystal. In the reflection polarizing layers obtained by immobilizing the cholesteric liquid crystalline phases, the in-plane phase difference is zero (nx=ny), but the reflection polarizing layer has an anisotropic refractive index ellipsoid in which the refractive index nz in the direction perpendicular to the phases satisfies nx=ny<nz or nx=ny>nz. In a case where a reflection polarizing plate is obtained by laminating a red reflection layer, a green reflection layer, and a blue reflection layer, the decrease in the transmitted light and the wavelength shift in each reflection layer are generated, and, as a result, decrease in the oblique brightness and the oblique tint change are generated.

As described above, in the related art, it has been considered that, the refractive index of the liquid crystalline phase in which the alignment is immobilized is immobilized, and thus the refractive index is not changed even if stretching is performed. However, as a result of intensive research of the present inventors, the present inventors have found that a film having an isotropic refractive index ellipsoid can be obtained by biaxially stretching a layer immobilizing a cholesteric liquid crystalline phase of a discotic liquid crystal compound. It is possible to convert the circular polarization in a case where the λ/4 plate is transmitted by linearly polarized light in a satisfactory manner without collapsing circular polarization of the transmitted light in the oblique direction, by forming a film having an isotropic refractive index ellipsoid. As a result, it is possible to improve the oblique tint change at a higher level.

That is, the above objects can be solved by the present invention.

An optical element according to the present invention comprises: a reflection polarizer which is formed of a discotic liquid crystal compound and in which a cholesteric liquid crystalline phase is immobilized, and in the reflection polarizer, a front retardation value Re satisfies 0 nm≤Re<10 nm in a range of ±50 nm outside a reflection center wavelength, and an absolute value |Ret (50°)| of a retardation value Ret in a polar angle 50° direction satisfies |Ret (50°)|≤50 nm.

Here, the expression "front" means a direction (normal direction) perpendicular to a surface of the reflection polarizer. A polar angle of 50° means a direction which is oblique by 50° with respect to an axis (normal line) orthogonal to a surface of a reflection polarizer.

In this specification, a retardation value Ret at a polar angle of 50° may be simply described as oblique Ret (50°) in some cases.

It is preferable that the reflection polarizer includes a first light reflecting layer, a second light reflecting layer, and a third light reflecting layer, and any one of the first light reflecting layer, the second light reflecting layer, and the third light reflecting layer is a blue reflection layer having a reflection center wavelength of 380 to 499 nm and having a peak of a reflectance of which a half-width is 100 nm or less, another is a green reflection layer having a reflection center wavelength of 500 to 599 nm and having a peak of a reflectance of which a half-width is 200 nm or less, and another is a red reflection layer having a reflection center wavelength of 600 to 750 nm and having a peak of a reflectance of which a half-width is 150 nm or less.

It is preferable that the optical element according to the present invention further comprises: a λ/4 plate on at least one surface of the reflection polarizer.

A method of manufacturing an optical element according to the present invention includes a reflection polarizer which is formed of a discotic liquid crystal compound and is obtained by immobilizing a cholesteric liquid crystalline phase, and the method comprising:

a step of forming a coating film with a polymerizable composition including a discotic liquid crystal compound;

a step of curing the coating film; and a step of biaxially stretching the cured coating film, so as to form the reflection polarizer.

A liquid crystal display device according to the present invention comprises at least: the optical element according to the present invention; a liquid crystal cell; and a backlight unit.

An optical element according to the present invention includes a reflection polarizer which is formed of a discotic liquid crystal compound and is obtained by immobilizing a cholesteric liquid crystalline phase. In the reflection polarizer, a front retardation value Re satisfies 0 nm≤Re<10 nm in a range of ±50 nm outside a reflection center wavelength, and an absolute value |Ret (50°)| of a retardation value Ret in a polar angle 50° direction satisfies |Ret (50°)|≤50 nm.

Since the optical element has an optical isotropic reflection polarizer, there is no phase difference in light which is obliquely incident to the reflection polarizer. Therefore, the circular polarization of the oblique transmitted light is not collapsed. In a case where the optical element is incorporated to the liquid crystal display device, an oblique tint change can be reduced.

According to the method of manufacturing an optical element according to the present invention, it is possible to obtain an optical element having a reflection polarizer in which a front retardation value Re satisfies 0 nm≤Re<10 nm in a range of ±50 nm outside a reflection center wavelength, and an absolute value |Ret (50°)| of a retardation value Ret in a polar angle 50° direction satisfies |Ret (50°)|≤50 nm.

The liquid crystal display device according to the present invention has an optical element including a reflection polarizer in which a front retardation value Re satisfies 0 nm≤Re<10 nm in a range of ±50 nm outside a reflection center wavelength, and an absolute value |Ret (50°)| of a retardation value Ret in a polar angle 50° direction satisfies |Ret (50°)|≤50 nm, and thus the circular polarization of the transmitted light in the oblique direction is not collapsed. Therefore, most of the circular polarization can be converted to linearly polarized light with a λ/4 plate. Accordingly, an oblique tint change can be decreased. With respect to each of red, green, and blue colors, decrease in transmittance or a wavelength shift are not generated, and thus oblique brightness is excellent.

DESCRIPTION OF THE PREFERRED EMBODIMENTS

Figure 1:
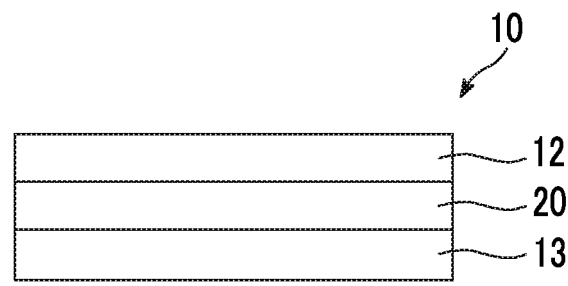
FIG. 1 is a schematic cross-sectional view illustrating one embodiment of an optical element according to the present invention.

Hereinafter, the present invention will be described in detail.

The description in the configurations described below is provided based on typical embodiments of the present invention, but the present invention is not limited to the embodiments.

In the present specification, the numerical range expressed by using "to" means a range including numerical values described before and after "to" as a lower limit value and an upper limit value.

In this specification, a "half-width" of a peak means the width of a peak at a height of ½ of a peak height.

A reflection center wavelength and a half-width of the reflection polarizer can be measured by an integral reflectometer. Here, the measuring is performed by using a device obtained by connecting an integrating sphere device ILV-471 to a spectrophotometer V-550 (both manufactured by JASCO Corporation) as an integral reflectometer. Among two wavelengths at which the transmittance becomes transmittance at a height of ½ with a standard of the maximum peak height, in a case where the value of the wavelength on a short wave side is λ1 (nm) and the value of the wavelength on a long wave side is λ2 (nm), the reflection center wavelength and the half-width are able to be denoted by the following expressions.

Reflection Center Wavelength=(λ1+λ2)/2

Half-Width=(λ2−λ1)

In the present invention, Re (λ) and Rth (λ) respectively represent the in-plane retardation and the thickness direction retardation at a wavelength λ.

According to the present invention, the retardations Re (λ) and Rth (λ) are obtained by using AxoScan (manufactured by Axometrics, Inc.). The in-plane retardation Re (λ) is a value measured by causing light at a wavelength λ to be incident from a normal direction of a film surface. An average refractive index ((Nx+Ny+Nz)/3) and a film thickness (d(μm)) are input to AxoScan, so as to calculate a slow axis direction (°) and a phase difference Rth(λ) in a thickness direction=
   ((Nx+Ny)/2−Nz)×d.

The oblique retardation Ret (50°) is a value measured by causing light at a wavelength λ to be incident from a polar angle 50° to a film surface.

In this specification, the oblique retardation value Ret (50°) is a measured value of retardation at a polar angle of 50°, that is, an angle θ oblique from the normal direction of the film surface is 50°.

A sign of the oblique retardation value Ret (50°) is a sign of retardation in a case where it is seen that a slow axis thereof is in a parallel direction to a film surface. For example, in a case where it is seen that the slow axis is in a parallel direction to a film surface (for example, Rth>C-plate of 0), a sign of the oblique retardation value Ret (50°) is positive, and in a case where it is seen that the slow axis is in a vertical direction to the film surface (for example, Rth<C-plate of 0), a sign of the oblique retardation value Ret (50°) is negative.

In this specification, "visible light" indicates light at 380 nm to 780 nm.

In this specification, an angle (for example, an angle of "90°" or the like), and a relationship thereof (for example "orthogonal", "parallel", "intersect at 45°", and the like) include an error range which is allowable in the technical field belonging to the present invention. For example, the angle indicates a range of less than an exact angle ±10°, and an error with respect to the exact angle is preferably less than or equal to 5°, and is more preferably less than or equal to 3°.

In this specification, an "absorption axis" of a polarizer or a polarizing plate means a direction with the highest absorbance. A "transmission axis" means a direction which forms an angle of 90° to the "absorption axis".

In this specification, a "slow axis" of a retardation film or the like means a direction in which a refractive index is maximized.

In this specification, a "polarizer" and a "reflection polarizer" are separately used.

In this specification, numerical values, numerical ranges, and qualitative expressions (for example, "equivalent", "equal", and the like) indicating optical properties of each member such as phase difference region, a retardation film, and a liquid crystal layer are interpreted as indicating numerical values, numerical ranges, and properties including error which is generally allowable in a liquid crystal display device and the members used therein.

<<Optical Element>>

The optical element according to the present invention is described. FIG. 1 is a schematic cross-sectional view illustrating one embodiment of an optical element according to the present invention. The optical element according to the present invention is not limited to the present embodiment.

An optical element 10 according to one embodiment of the present invention is obtained by laminating a reflection polarizer 13 on a λ/4 plate 12 via an adhesive layer 20 as illustrated in FIG. 1. The optical element 10 includes the reflection polarizer 13 which is formed of a discotic liquid crystal compound and is obtained by immobilizing a cholesteric liquid crystalline phase, and a front retardation value Re satisfies 0 nm≤Re<10 nm in a range of ±50 nm outside a reflection center wavelength, and an absolute value |Ret (50°)| of a retardation value Ret in a polar angle 50° direction satisfies |Ret (50°)|≤50 nm.

The reflection polarizer 13 according to the present invention is formed by a biaxially stretched film obtained by biaxially stretching an optical film obtained by immobilizing a cholesteric liquid crystalline phase.

The optical element of the present invention has a reflection polarizer, and the light reflecting layer obtained by immobilizing a cholesteric liquid crystalline phase included in the reflection polarizer can reflect at least one of right circular polarization or left circular polarization in a wavelength range near the reflection center wavelength thereof.

The front retardation value Re preferably satisfies 0 nm≤Re<5 nm, and the absolute value |Ret (50°)| of the retardation value Ret in the polar angle 50° direction satisfies |Ret (50°)|≤30 nm. It is more preferable that the front retardation value Re satisfies 0 nm≤Re<3 nm and |Ret (50°)|≤10 nm.

The optical element of the present invention has the front retardation value and the oblique retardation value in the above range, and thus phase difference is not generated in the obliquely incident light. Therefore, in a case where the optical element is incorporated to the liquid crystal display device, an oblique tint change can be suppressed.

<Reflection Polarizer>

Figure 2:
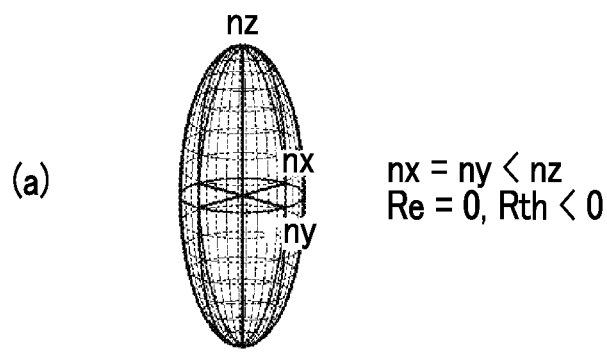
FIG. 2 is a diagram illustrating a refractive index ellipsoid before and after biaxial stretching of a reflection polarizer according to the present invention.
Figure 2:
Figure 2:
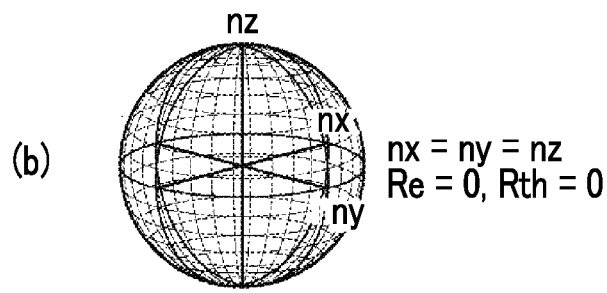

The reflection polarizer in the optical element according to the present invention is described with reference to FIG. 2. FIG. 2 is a diagram illustrating a refractive index ellipsoid before and after biaxial stretching of a reflection polarizer (a layer which is formed of a discotic liquid crystal compound and which is obtained by immobilizing a cholesteric liquid crystalline phase) in the optical element of the present invention. (a) of FIG. 2 illustrates a refractive index ellipsoid before the reflection polarizer is biaxially stretched. (b) of FIG. 2 is a diagram illustrating a refractive index ellipsoid after the reflection polarizer is biaxially stretched.

As illustrated in (a) of FIG. 2, before the layer which is formed of the discotic liquid crystal compound and is obtained by immobilizing the cholesteric liquid crystalline phase is biaxially stretched, the in-phase phase difference is zero (nx=ny), but a refractive index nz in a perpendicular direction satisfies nx=ny<nz, and the refractive index ellipsoid is anisotropic.

Meanwhile, as illustrated in (b) of FIG. 2, the reflection polarizer in the optical element of the present invention is obtained by biaxially stretching a layer which is formed of the discotic liquid crystal compound and is obtained by immobilizing the cholesteric liquid crystalline phase, nx=ny=nz is satisfied, and the refractive index ellipsoid is isotropic.

The refractive index ellipsoid is isotropic as described above, and thus the circular polarization of the transmitted light in the oblique direction is not collapsed. Therefore, in a case where the refractive index ellipsoid is incorporated to the liquid crystal display device, the oblique tint change can be suppressed.

Figure 3:
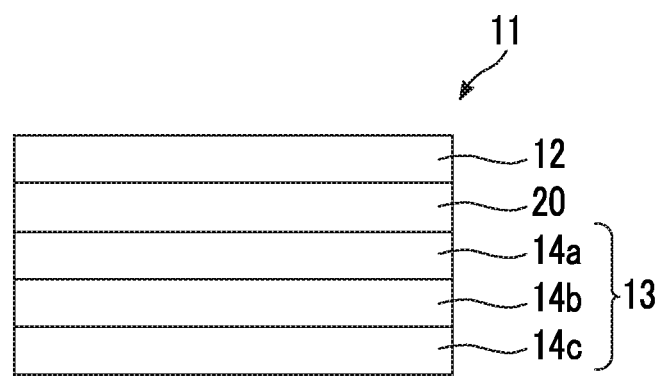
FIG. 3 is a schematic cross-sectional view illustrating another embodiment of the optical element according to the present invention.

Subsequently, another embodiment of the optical element of the present invention is described. FIG. 3 is a schematic cross-sectional view illustrating one embodiment of an optical element according to the present invention.

As illustrated in FIG. 3, the reflection polarizer 13 an optical element 11 of the present embodiment includes a first light reflecting layer 14a, a second light reflecting layer 14b, and a third light reflecting layer 14c. There is illustrated an aspect in which the reflection polarizer 13 including three layers of the first light reflecting layer 14a, the second light reflecting layer 14b, and the third light reflecting layer 14c is laminated on the λ/4 plate 12 via the adhesive layer 20.

The present invention is not limited to an aspect illustrated in FIG. 3, the reflection polarizer 13 including three layers of the first light reflecting layer 14a, the second light reflecting layer 14b, and the third light reflecting layer 14c are directly connected to the λ/4 plate 12 via the adhesive layer 20. The reflection polarizer 13 may have a layer other than the first light reflecting layer 14a, the second light reflecting layer 14b, and the third light reflecting layer 14c.

The λ/4 plate 12 illustrated in FIGS. 1 and 3 may be a single layer, or a laminate of two or more layers, and it is preferable that the λ/4 plate is a laminate of two or more layers.

A mechanism in which brightness increases in a case where the optical element of the present invention is incorporated to the liquid crystal display device is described below.

In the optical element of the present invention, any one of the first light reflecting layer, the second light reflecting layer, and the third light reflecting layer included in the reflection polarizer is a blue light reflecting layer, any one is a green light reflecting layer, and any one is a red light reflecting layer. The reflection polarizer can reflect at least one of the right circular polarization or the left circular polarization with respect to the blue light, the green light, and the red light. According to the action of the λ/4 plate, the polarization state can be converted from the circular polarization to the linearly polarized light. According to this configuration, the circular polarization (for example, right circular polarization) in the first polarization state is substantially reflected by the reflection polarizer, the circular polarization (for example, left circular polarization) in the second polarization state is substantially transmitted by the reflection polarizer, and the light that is transmitted by the reflection polarizer in the second polarization state (for example, left circular polarization) is converted to the linearly polarized light by the λ/4 plate.

The light in the first polarization state which is substantially reflected on the reflection polarizer by a reflection member described below (also referred to as a light guide device and an optical resonator) is recirculated, and a part of the light is reflected again by the reflection polarizer as the circular polarization in the first polarization state and a part of the remaining light is transmitted as the circular polarization in the second polarization state, and thus, a light utilization rate on a backlight-side increases and the brightness of the liquid crystal display device is able to be enhanced.

The polarization state of the light exiting from the reflection polarizer, that is, the polarization state of transmitted light and reflected light of the reflection polarizer, for example, is able to be measured by performing polarization measurement using Axoscan manufactured by Axometrics Inc.

It is preferable that any one of the first light reflecting layer 14a, the second light reflecting layer 14b, and the third light reflecting layer 14c is a blue reflection layer having a reflection center wavelength of 380 to 499 nm and having a peak of a reflectance of which a half-width is 100 nm or less, another is a green reflection layer having a reflection center wavelength of 500 to 599 nm and having a peak of a reflectance of which a half-width is 200 nm or less, and another is a red reflection layer having a reflection center wavelength of 600 to 750 nm and having a peak of a reflectance of which a half-width is 150 nm or less.

An infrared light reflecting layer which is in contact with the third light reflecting layer 14c, has a reflection center wavelength of 750 nm to 850 nm, and has a peak of reflectance of which a half-width is 200 nm or less may be provided.

The film thickness of the optical element of the present invention is preferably 3 to 120 μm, more preferably 5 to 100 μm, and particularly preferably 6 to 90 μm.

The blue reflection layer has a reflection center wavelength in a wavelength range of 380 to 499 nm and has a peak of reflectance of which a half-width is 100 nm or less.

The reflection center wavelength of the blue reflection layer is preferably in a wavelength range of 430 to 480 nm and more preferably in a wavelength range of 430 to 470 nm.

The half-width of the peak of the reflectance of the blue reflection layer is preferably 100 nm or less, the half-width of the peak of the reflectance is more preferably 90 nm or less, and the half-width of the peak of the reflectance is particularly preferably 80 nm or less.

It is preferable that the blue reflection layer does not have a peak of reflectance in a wavelength range of 500 to 750 nm. It is preferable that the blue reflection layer has an average reflectance in a range of 500 to 750 nm of 5% or less.

The film thickness of the blue reflection layer is preferably 2 to 10 μm and more preferably 3 to 7 μm.

The green reflection layer has a reflection center wavelength in a wavelength range of 500 to 599 nm and has a peak of reflectance of which a half-width is 200 nm or less.

The reflection center wavelength of the green reflection layer is preferably in a wavelength range of 520 to 590 nm and more preferably in a wavelength range of 520 to 580 nm.

The half-width of the peak of the reflectance of the green reflection layer is preferably 160 nm or less, the half-width of the peak of the reflectance is more preferably 125 nm or less, the half-width of the peak of the reflectance is even more preferably 100 nm or less, and the half-width of the peak of the reflectance is particularly preferably 95 nm or less.

It is preferable that the green reflection layer does not have a peak of reflectance in a wavelength range of 380 to 499 nm and 600 to 750 nm. It is preferable that the green reflection layer has an average reflectance in a range of 380 to 499 nm and 600 to 750 nm is 5% or less.

The film thickness of the green reflection layer is preferably 2 to 10 μm and more preferably 3 to 7 μm.

The red reflection layer has a reflection center wavelength in a wavelength range of 600 to 750 nm and has a peak of reflectance of which a half-width is 150 nm or less.

The reflection center wavelength of the red reflection layer is preferably in a wavelength range of 610 to 690 nm and more preferably in a wavelength range of 610 to 660 nm.

The half-width of the peak of the reflectance of the red reflection layer is preferably 130 nm or less, the half-width of the peak of the reflectance is more preferably 110 nm or less, and the half-width of the peak of the reflectance is particularly preferably 100 nm or less.

It is preferable that the red reflection layer does not have a peak of reflectance in a wavelength range of 380 to 499 nm and 500 to 599 nm. It is preferable that the red reflection layer has an average reflectance in a range of 380 to 499 nm and 500 to 599 nm is 5% or less.

The film thickness of the red reflection layer is preferably 2 to 10 μm and more preferably 3 to 7 μm.

It is preferable that all of the blue reflection layer, the green reflection layer, and the red reflection layer have a half-width of a peak of reflectance of 30 nm or greater, for reflection of emitted light of the backlight unit.

According to the above configuration, reflection ranges of blue, green, and red reflection polarizers can be broadened. In the broadening of this reflection range, it is possible to use a pitch gradient method of gradually changing the helical pitch of the cholesteric liquid crystal phase so as to realize a wide half-width. The pitch gradient method can be realized by the methods described in 1995 (Nature 378, 467 to 469, 1995), JP1994-281814A (JP-H06-281814A) and JP4990426B. All of the three light reflecting layers are reflection polarizers obtained by immobilizing a cholesteric liquid crystalline phase.

A wavelength (that is, a reflection center wavelength) providing a peak of a reflectance can be adjusted by changing a pitch or a refractive index of a helical structure in a cholesteric liquid crystalline phase of a reflection polarizer obtained by immobilizing a cholesteric liquid crystalline phase, but the change of the pitch can be easily adjusted by changing an addition amount of a chiral agent. Specifically, there is a detailed description in Fujifilm Research Report No. 50 (2005) p. 60 to 63.

In the first light reflecting layer, the second light reflecting layer, and the third light reflecting layer, a helical direction of a helical structure of each cholesteric liquid crystalline phase is not particularly limited, but it is preferable that the helical directions of the helical structures of the respective cholesteric liquid crystalline phases of the first light reflecting layer, the second light reflecting layer, and the third light reflecting layer are identical to each other. As a result, the phase states of the circular polarization reflected by each layer can be aligned to prevent each wavelength region from having different polarization states, and thus light utilization efficiency can be improved. For example, it is preferable that, in the first light reflecting layer, the second light reflecting layer, and the third light reflecting layer, all of the cholesteric liquid crystalline phases have right helical structure, and all of the first light reflecting layer, the second light reflecting layer, and the third light reflecting layer reflect the right circular polarization in the reflection center wavelength. Naturally, it is preferable that, in the first light reflecting layer, the second light reflecting layer, and the third light reflecting layer, all of the cholesteric liquid crystalline phases have left helical structures, and all of the first light reflecting layer, the second light reflecting layer, and the third light reflecting layer reflect the left circular polarization in the reflection center wavelength.

A method of manufacturing a reflection polarizer obtained by immobilizing a cholesteric liquid crystalline phase is not particularly limited. For example, methods disclosed in JP1989-133003A (JP-H01-133003A), JP3416302B, JP3363565B, and JP1996-271731A (JP-H08-271731A) can be used.

Hereinafter, the method disclosed in JP1996-271731A (JP-H08-271731A) is described.

A reflection polarizer in the optical element of the present invention is formed by curing and stretching a polymerizable composition including a discotic liquid crystal compound. Here, a discotic liquid crystal compound which is a component of a polymerizable composition used in the manufacturing of an optical element, other components, and a solvent thereof are described.

—Discotic Liquid Crystal Compound—

First, a discotic liquid crystal compound which is a material of a reflection polarizer obtained by immobilizing of a cholesteric liquid crystalline phase is described.

For example, discotic liquid crystal compounds disclosed in JP2007-108732A or JP2010-244038A can be preferably used, but the present invention is not limited thereto.

Hereinafter, preferable examples of the discotic liquid crystal compound are provided below, but the present invention is not limited thereto.

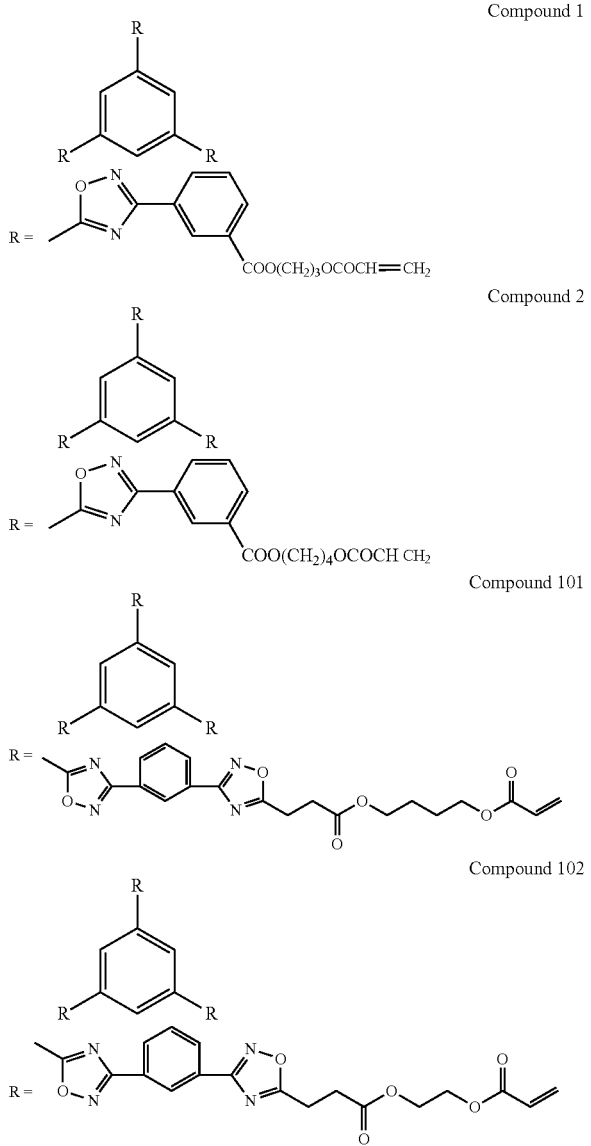

Compound 1

Compound 2

Compound 101

Compound 102

—Other Components—

The polymerizable composition used for forming the reflection polarizer obtained by immobilizing the cholesteric liquid crystalline phase may contain other components such as a chiral agent, an alignment control agent, a polymerization initiator, and an alignment aid, in addition to the discotic liquid crystal compound.

The chiral agent can be selected from various known chiral agents (for example, a chiral agent disclosed in Liquid Crystal Device Handbook, Chapter 3, pp. 4-3, a chiral agent for TN and STN, and a chiral agent disclosed in p. 199, Japan Society for the Promotion of Science edited by the 142nd committee in 1989). In general, the chiral agent includes an asymmetric carbon atom, but an axial asymmetric compound or a planar asymmetric compound which does not include the asymmetric carbon atom is also able to be used as the chiral agent. In an example of the axial asymmetric compound or the planar asymmetric compound, binaphthyl, helicene, paracyclophane, and a derivative thereof are included. The chiral agent may have a polymerizable group. In a case where the chiral agent has a polymerizable group and the rod-like liquid crystal compound used together also has a polymerizable group, a polymer having a repeating unit derived from the rod-like liquid crystal compound and a repeating unit derived from the chiral agent is able to be formed by a polymerization reaction between the chiral agent having a polymerizable group and a polymerizable rod-like liquid crystal compound. In the aspect, it is preferable that the polymerizable group of the chiral agent having a polymerizable group is identical to the polymerizable group of the polymerizable rod-like liquid crystal compound. Accordingly, the polymerizable group of the chiral agent is preferably an unsaturated polymerizable group, an epoxy group, or an aziridinyl group, is more preferably an unsaturated polymerizable group, and is particularly preferably an ethylenically unsaturated polymerizable group.

The chiral agent described above may be a liquid crystal compound.

Examples of the chiral agent exhibiting a strong twisting force include chiral agents disclosed in JP2010-181852A, JP2003-287623A, JP2002-80851A, JP2002-80478A, and JP2002-302487A, and the chiral agents are able to preferably be used in the present invention. Isomannide compounds having a corresponding structure are able to be used as isosorbide compounds disclosed in the publications, and isosorbide compounds having a corresponding structure are able to be used as isomannide compounds disclosed in the publications.

Examples of the alignment control agent include compounds exemplified in [0092] and of JP2005-99248A, compounds exemplified in [0076] to [0078] and [0082] to [0085] of JP2002-129162A, compounds exemplified in [0094] and [0095] of JP2005-99248A, and compounds exemplified in [0096] of JP2005-99248A.

A fluorine-based alignment control agent is preferably a compound represented by Formula (I).

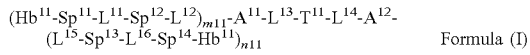

$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}(L^{15}\text{-}Sp^{13}\text{-}L^{16}\text{-}Sp^{14}\text{-}Hb^{11})_{n11}$   Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, and —CONR— (R in Formula (I) represents a hydrogen atom or an alkyl group having 1 to 6 carbon atoms). —NRCO— and —CONR— have an effect of reducing the solubility, and thus a haze value tends to increase in a case of film formation. Therefore, —O—, —S—, —CO—, —COO—, —OCO—, —COS—, and —SCO— are preferable, and —O—, —CO—, —COO—, and —OCO— are more preferable, in view of stability of the compound. The alkyl group that R can take may be linear or branched. The number of carbon atoms is more preferably 1 to 3, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and even more preferably a single bond or an alkylene group having 1 to 4 carbon atoms. However, the hydrogen atom of the alkylene group may be substituted with a fluorine atom. The alkylene group may be branched or unbranched, but an unbranched linear alkylene group is preferable. In view of synthesis, it is preferable that $Sp^{11}$ and $Sp^{14}$ are identical to each other and $Sp^{12}$ and $Sp^{13}$ are identical to each other.

$A^{11}$ and $A^{12}$ are trivalent or tetravalent aromatic hydrocarbons. The number of the trivalent or tetravalent aromatic hydrocarbon group is preferably 6 to 22 carbon atoms, more preferably 6 to 14 carbon atoms, even more preferably 6 to 10 carbon atoms, and particularly preferably 6 carbon atoms. The trivalent or tetravalent aromatic hydrocarbon group represented by $A^{11}$ and $A^{12}$ may have a substituent. Examples of the substituent include an alkyl group having 1 to 8 carbon atoms, an alkoxy group, a halogen atom, a cyano group, or an ester group. With respect to the description and the scope of these groups, description corresponding to $T^{11}$ below can be referred to. Examples of substituents for trivalent or tetravalent aromatic hydrocarbon groups represented by $A^{11}$ and $A^{12}$ include a methyl group, an ethyl group, a methoxy group, an ethoxy group, a bromine atom, a chlorine atom, and a cyano group. A molecule having many perfluoroalkyl moieties in the molecule can align liquid crystals with a small addition amount and leads to haze reduction, and thus it is preferable that $A^{11}$ and $A^{12}$ are tetravalent aromatic hydrocarbon groups so as to have a large number of perfluoroalkyl groups in the molecule. In view of synthesis, it is preferable that $A^{11}$ and $A^{12}$ are identical to each other.

It is preferable that $T^{11}$ represents a divalent group or a divalent aromatic heterocyclic group as described below (X included in the following $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms).

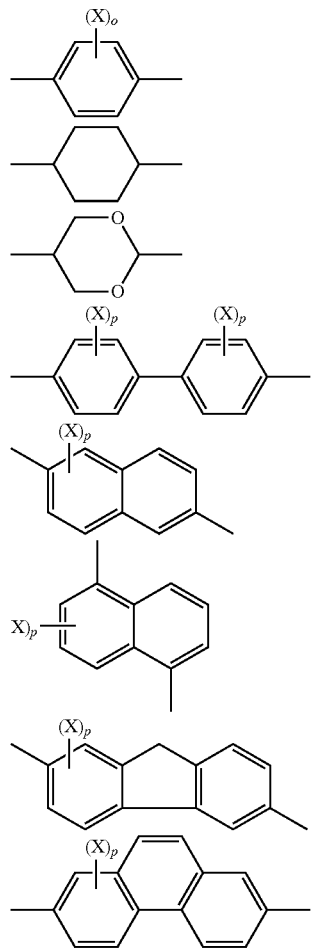

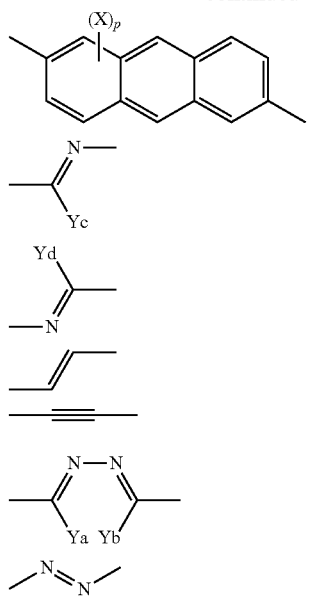

Among these, more preferable groups are as follows.

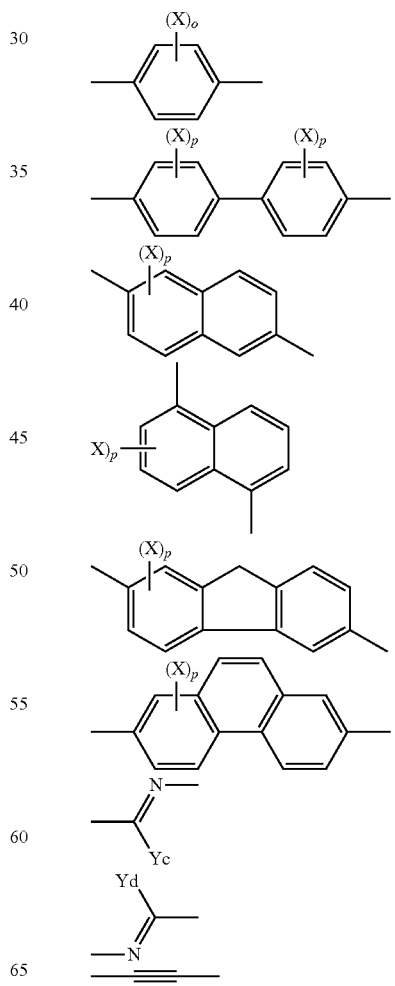

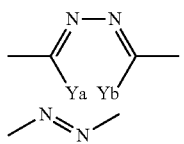

Among these, even more preferable groups are as follows.

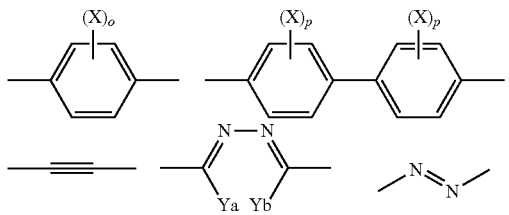

Among these, the most preferable group is as follows.

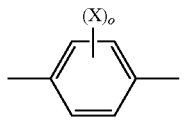

The number of carbon atoms of an alkyl group which X included in the $T^{11}$ may take is 1 to 8, preferably 1 to 5, and more preferably 1 to 3. The alkyl group may have any one of a linear shape, a branched shape, and a cyclic shape, and a linear shape or branched shape is preferable. Examples of the preferred alkyl groups include a methyl group, an ethyl group, an n-propyl group, an isopropyl group. Among these, a methyl group is preferable.

With respect to an alkyl moiety of the alkoxy group which X included in $T^{11}$ may take, the description and the preferable scope of the alkyl group which X included in $T^{11}$ may take may be referred to. Examples of the halogen atom which X included in $T^{11}$ may take include a fluorine atom, a chlorine atom, a bromine atom, and an iodine atom, and a chlorine atom and a bromine atom are preferable. Examples of the ester group which X included in TH may take include a group represented by $R^aCOO—$. Examples of $R^a$ include an alkyl group having 1 to 8 carbon atoms. With respect to the description and the scope of alkyl groups that $R^a$ can take, the description and the preferable scope of the alkyl groups which X included in $T^{11}$ may take may be referred to. Specific examples of ester include $CH_3COO—$ and $C_2H_5COO—$. The alkyl group having 1 to 4 carbon atoms that Ya, Yb, Yc, and Yd may take may be linear or branched. Examples thereof include a methyl group, an ethyl group, an n-propyl group, and an isopropyl group.

It is preferable that the divalent aromatic heterocyclic group has a 5-membered, 6-membered, or 7-membered heterocyclic ring. A 5-membered or 6-membered ring is more preferable, and a 6-membered ring is most preferable. As a hetero atom forming a heterocyclic ring, a nitrogen atom, an oxygen atom, and a sulfur atom are preferable. It is preferable that the heterocyclic ring is an aromatic heterocyclic ring. The aromatic heterocyclic ring is generally an unsaturated heterocyclic ring. An unsaturated heterocyclic ring having the most double bonds is more preferable. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. With respect to the description and the preferable scope of examples of the substituent, the descriptions and disclosures on the substituent which trivalent or tetravalent aromatic hydrocarbon of $A^{11}$ and $A^{12}$ may take may be referred to.

$Hb^{11}$ represents a perfluoroalkyl group having 2 to 30 carbon atoms, more preferably a perfluoroalkyl group having 3 to 20 carbon atoms, and even more preferably a perfluoroalkyl group having 3 to 10 carbon atoms. The perfluoroalkyl group may have any one of a linear shape, a branched shape, and a cyclic shape, is preferably a linear shape, a branched shape, and is more preferably a linear shape.

m11 and n11 each independently represent 0 to 3, and satisfies m11+n11≥1. At this point, a plurality of structures existing in parentheses may be identical to or different from each other, but it is preferable that the structures are identical to each other. m11 and n11 in Formula (I) are determined by the valences of $A^{11}$ and $A^{12}$, and the preferable range is determined by the preferable range of the valences of $A^{11}$ and $A^{12}$.

o and p included in $T^{11}$ are each independently an integer of 0 or greater, and, in a case where o and p are 2 or greater, the plurality of X's may be identical to or different from each other. o included in $T^{11}$ is preferably 1 or 2. p included in $T^{11}$ is preferably any integer of 1 to 4 and more preferably 1 or 2.

The molecular structure of the compound represented by Formula (I) may have a symmetry or may not have a symmetry. The expression "symmetry" described here means any one of point symmetry, line symmetry, or rotationally symmetry, and the expression "asymmetric" means one which corresponds to none of point symmetry, line symmetry, or rotational symmetry.

The compound represented by Formula (I) is a perfluoroalkyl group ($Hb^{11}$), a linking group $-(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$ and preferably a compound obtained by combining $T^{11}$ which is a divalent group having an exclusion volume effect. It is preferable that the two perfluoroalkyl groups ($Hb^{11}$) existing in the molecule are identical to each other, and it is preferable that the linking groups, $-(-Sp^{11}-L^{11}-Sp^{12}-L^{12})_{m11}-A^{11}-L^{13}-$ and $-L^{14}-A^{12}-(L^{15}-Sp^{13}-L^{16}-Sp^{14}-)_{n11}-$ existing in the molecule are also identical to each other. $Hb^{11}-Sp^{11}-L^{11}-Sp^{12}-$ and $-Sp^{13}-L^{16}-Sp^{14}-Hb^{11}$ at the terminal are preferably groups represented by any one of formulae below.

$(C_aF_{2a+1})—(C_bH_{2b})—$ $(C_aF_{2a+1})—(C_bH_{2b})—(C_rH_{2r})—$ $(C_aF_{2a+1})—(C_bH_{2b})—COO—(C_rH_{2r})—$ $(C_aF_{2a+1})—(C_bH_{2b})—OCO—(C_rH_{2r})—$

In the above formulae, a is preferably 2 to 30, more preferably 3 to 20, and even more preferably 3 to 10. b is preferably 0 to 20, more preferably 0 to 10, and even more preferably 0 to 5. a+b is 3 to 30. r is preferably 1 to 10 and more preferably 1 to 4.

Hb[11]-Sp[11]-L[11]-Sp[12]-L[12]- and -L[14]-Sp[13]-L[16]-Sp[14]-Hb[11] at the terminal of Formula (I) are preferably groups represented by any one of formulae below.

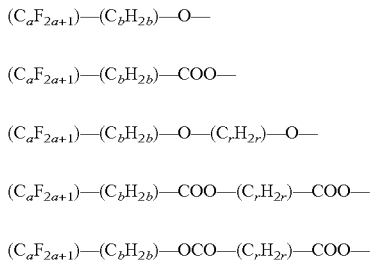

The definitions of a, b, and r in the above formulae are the same as those in the immediately above.

Examples of a photopolymerization initiator include an α-carbonyl compound (disclosed in each of the specifications of U.S. Pat. Nos. 2,367,661A and 2,367,670A), acyloin ether (disclosed in the specification of U.S. Pat. No. 2,448,828A), α-hydrocarbon-substituted aromatic acyloin compounds (disclosed in the specification of U.S. Pat. No. 2,722,512A), a polynuclear quinone compound (disclosed in each of the specifications of U.S. Pat. Nos. 3,046,127A and 2,951,758A), a combination of a triarylimidazole dimer and p-amino phenyl ketone (disclosed in the specification of U.S. Pat. No. 3,549,367A), an acridine compound and a phenazine compound (disclosed in JP1985-105667A (JP-S60-105667A) and in the specification of U.S. Pat. No. 4,239,850A) and an oxadiazole compound (disclosed in the specification of U.S. Pat. No. 4,212,970A), an acyl phosphine oxide compound (disclosed in JP1988-40799B (JP-S63-40799B), JP1993-29234B (JP-H05-29234B), JP1998-95788A (JP-H10-95788A), and JP1998-29997A (JP-H10-29997A)), and the like.

—Solvent—

An organic solvent is preferably used as a solvent of a composition for forming each of the reflection polarizer. Examples of the organic solvent include amide (for example, N,N-dimethyl formamide), sulfoxide (for example, dimethyl sulfoxide), a heterocyclic compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). The alkyl halide and the ketone are preferable. Two or more types of organic solvents may be used in combination.

Subsequently, members which may be included in the optical element of the present invention and which may be used in the method of manufacturing an optical element are described.

<Support>

The optical element of the present invention may include a support or may have a reflection polarizer on the support. Here, according to the present invention, as illustrated in FIG. 1, a λ/4 plate (described below) that may be included in the optical element of the present invention may be used as a support so as to bond a reflection polarizer to the λ/4 plate, or the entire λ/4 plate formed on the support may be used as the support so as to bond the reflection polarizer to the support.

The support is preferably a transparent support, and examples thereof include a polyacrylic resin film such as polymethyl methacrylate, a cellulose resin film such as cellulose triacetate, and a cycloolefin polymer-based film [for example, trade name "ARTON", manufactured by JSR Corporation and trade name "ZEONOR", manufactured by Zeon Corporation].

On the other hand, the optical element of the present invention may not include the support used in a case of forming the reflection polarizer. For example, glass or a transparent film may be used as a support (hereinafter, referred to as a "temporary support"), in a case of forming the reflection polarizer, the reflection polarizer is formed, and the reflection polarizer is peeled off from the temporary support, so as to obtain the optical element of the present invention. It is preferable that, in a case where only the reflection polarizer is peeled off from the temporary support after the reflection polarizer is formed, a film obtained by laminating the λ/4 plate and the adhesive layer (and/or pressure sensitive material) is used as a support, the reflection polarizer is bonded to the λ/4 plate via the adhesive layer, so as to obtain the optical element of the present invention.

The support used in a case of forming a film is not particularly limited, but preferably has physical properties that endure stretching, peeling, or the like in manufacturing steps described below.

<Alignment Layer>

It is preferable that a surface (a surface coated with a polymerizable composition) on which the reflection polarizer is formed includes an alignment layer in order to obtain desired liquid crystal alignment, and, herein, in order to obtain a desired cholesteric liquid crystalline phase.

The alignment layer can be provided by means such as a rubbing treatment of an organic compound (preferably, a polymer), oblique vapor deposition of an inorganic compound, and formation of a layer having microgrooves. There is also known an alignment layer in which an orientation function is generated by application of an electric field, application of a magnetic field, or light irradiation. It is preferable that the alignment layer is formed by performing a rubbing treatment on the surface of the polymer film. In a case where a reflection polarizer is peeled off from the temporary support after the reflection polarizer is formed, it is preferable that the alignment layer and the temporary support are peeled off together.

Depending on the types of polymers used in the support, even in a case where an alignment layer is not provided, an alignment treatment (for example, a rubbing treatment) is directly performed on the support, so as to cause the support to function as the alignment layer. Examples of the support include polyethylene terephthalate (PET).

In a case where the liquid crystal layer is directly laminated on the liquid crystal layer, for example, in a case where a second light reflecting layer is formed directly on the first light reflecting layer, an underlayer liquid crystal layer functions as an alignment layer so as to align an upper layer liquid crystal, in some cases. In such cases, even in a case where the alignment layer is not provided, or even in a case where a special alignment treatment (for example, a rubbing treatment) is not performed, an upper layer liquid crystal may be aligned.

—Rubbing Treatment—

It is preferable that the surfaces of the alignment layer or the support are subjected to a rubbing treatment. A rubbing treatment may be performed on the surfaces of the first, second, and third light reflecting layers, if necessary. In general, the rubbing treatment is able to be performed by rubbing the surface of a film containing a polymer as a main component with paper or cloth in a constant direction. A general method of the rubbing treatment, for example, is disclosed in "Liquid Crystal Handbook" (published by Maruzen Company, Limited, Oct. 30, 2000).

A method disclosed in "Liquid Crystal Handbook" (published by Maruzen Company, Limited) is able to be used as a method of changing a rubbing density. A rubbing density (L) is able to be quantified by Expression (A) described below.

$$L=Nl(1+2\pi rn/60v) \quad \text{Expression (A)}$$

In Expression (A), N represents the number of rubbing treatments, l represents a contact length of a rubbing roller, r represents the radius of the roller, n represents the number of rotations of the roller (rpm), and v represents a stage shifting speed (per second).

In order to increase the rubbing density, the number of rubbing treatments may increase, the contact length of the rubbing roller may increase, the radius of the roller may increase, the number of rotations of the roller may increase, and the stage shifting speed may decrease, and in order to decrease the rubbing density, these factors are adjusted vice versa. Conditions at the time of performing the rubbing treatment can be referred to conditions disclosed in JP4052558B.

<λ/4 Plate>

The optical element according to the present invention may include a λ/4 plate on at least one surface of the reflection polarizer.

The λ/4 plate is a layer for converting circular polarization that passes through the reflection polarizer to the linearly polarized light. At the same time, it is preferable to cancel the phase difference of the film thickness of the reflection polarizer generated in a case of being viewed from the oblique orientation by adjusting the retardation (Rth (λ)) in the thickness direction.

In the optical element of the present invention, Rth (550) of the λ/4 plate is preferably −120 to 120 nm, more preferably −80 to 80 nm, and particularly preferably −70 to 70 nm.

In the optical element of the present invention, the λ/4 plate preferably satisfies at least one of Expression (A), (B), or (C) below and more preferably satisfies all of Expressions (A) to (C) below.

$$450 \text{ nm}/4-35 \text{ nm} < Re(450) < 450 \text{ nm}/4+35 \text{ nm} \quad \text{Expression (A)}$$

$$550 \text{ nm}/4-35 \text{ nm} < Re(550) < 550 \text{ nm}/4+35 \text{ nm} \quad \text{Expression (B)}$$

$$630 \text{ nm}/4-35 \text{ nm} < Re(630) < 630 \text{ nm}/4+35 \text{ nm} \quad \text{Expression (C)}$$

Materials of the λ/4 plate used in the optical element of the present invention are not particularly limited. Various polymer films, for example, a polyester-based polymer such as cellulose acylate, a polycarbonate-based polymer, polyethylene terephthalate, or polyethylene naphthalate, an acrylic polymer such as polymethyl methacrylate, a styrene-based polymer such as polystyrene or an acrylonitrile-styrene copolymer (an AS resin), and the like are able to be used. A polymer film is prepared by using one type or two or more types of polymers are selected from polyolefin such as polyethylene and polypropylene, a polyolefin-based polymer such as an ethylene-propylene copolymer, an amide-based polymer such as a vinyl chloride-based polymer, nylon, or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, or a polymer in which the polymers described above are mixed as a main component, and the polymers are used for preparing an optical element in a combination of satisfying the properties described above.

The λ/4 plate may be an optical anisotropy support having a desired λ/4 function in the support itself, or may be a plate including an optical anisotropic layer or the like on the support formed of a polymer film.

In a case where the λ/4 plate is the optical anisotropy support having a desired λ/4 function in the support itself, for example, the optical anisotropy support is able to be obtained by a method in which a polymer film is subject to a monoaxial stretching treatment or a biaxially stretching treatment, or the like. The type of polymer is not particularly limited, but a polymer having excellent transparency is preferably used. Examples of the polymer include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester resin-based film such as polyethylene terephthalate and polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, and a cycloolefin polymer film [for example, trade name "ARTON", manufactured by JSR Corporation, trade name "ZEONOR" and "ZEONEX" manufactured by Zeon Corporation]. Among them, the triacetyl cellulose, the polyethylene terephthalate, and a cycloolefin polymer-based film are preferable, and the triacetyl cellulose is particularly preferable.

As described below, an angle between a slow axis direction of the λ/4 plate and an absorption axis direction of the polarizing plate is 30° to 60°, is preferably 35° to 55°, is more preferably 40° to 50°, and is particularly preferably 45°. In a case where the polarizing plate is prepared in a roll to roll manner, in general, a longitudinal direction (a transport direction) is an absorption axis direction, and thus, it is preferable that an angle between the slow axis direction of the λ/4 plate and the longitudinal direction is 30° to 60°. A manufacturing method of the λ/4 plate in which the angle between the slow axis direction and the longitudinal direction is 30° to 60° is not particularly limited insofar as an alignment axis of a polymer is inclined at a desired angle by being continuously stretched in a direction at 30° to 60° with respect to the longitudinal direction, and a known method is able to be adopted as the manufacturing method. A stretching machine used in oblique stretching is not particularly limited, but a known tenter stretching machine of the related art is able to be used in which a feeding force or pulling force, or a taking off force having speeds different in right and left is able to be applied in a horizontal direction or a vertical direction. Examples of a tenter type stretching machine include a horizontally monoaxially stretching machine, a simultaneously biaxially stretching machine, and the like, but the tenter type stretching machine is not particularly limited insofar as a long film is able to be continuously subjected to an oblique stretching treatment, and various types of stretching machines are able to be used.

For example, methods disclosed in JP1975-83482A (JP-S50-83482A), JP1990-113920A (JP-H02-113920A), JP1991-182701A (JP-H03-182701A), JP2000-9912A, JP2002-86554A, JP2002-22944A, and WO2007/111313A are able to be used as a method of the oblique stretching.

In a case where the λ/4 plate includes the optical anisotropic layer or the like on the support formed of the polymer film, other layers are laminated on the support, and thus, a desired λ/4 function is obtained. The configuration material of the optical anisotropic layer is not particularly limited, but the optical anisotropic layer may be a layer which is formed of a composition containing a liquid crystal compound and exhibits optical anisotropy expressed by aligning molecules of the liquid crystal compound or a layer which has optical anisotropy expressed by stretching a polymer film and by aligning the polymer in the film, or may be both of the layers. That is, the optical anisotropic layer is able to be configured of one or two or more biaxial films, and is also able to be configured of a combination of two or more monoaxial films such as a combination of a C-plate and an A-plate. Naturally, the optical anisotropic layer is able to be configured of a combination of one or more biaxial films and one or more monoaxial films.

It is preferable that the λ/4 plate includes at least one layer formed of the composition containing the liquid crystal compound. That is, it is preferable that the λ/4 plate is a laminate of the polymer film (the support) and the optical anisotropic layer formed of the composition containing the liquid crystal compound.

In the support, a polymer film having small optical anisotropy may be used, and a polymer film exhibiting optical anisotropy by a stretching treatment and the like may be used. With respect to the support, it is preferable that light transmittance is 80% or greater.

The type of liquid crystal compound which is used for forming the optical anisotropic layer is not particularly limited. For example, an optical anisotropic layer which is obtained by forming a low molecular liquid crystal compound in nematic alignment in a liquid crystal state, and then, by immobilizing the alignment by photocross-linking or thermal cross-linking, or an optical anisotropic layer which is obtained by forming a high molecular liquid crystal compound in nematic alignment in a liquid crystal state, and then, by immobilizing the alignment by cooling is able to be used. Furthermore, in the present invention, even in a case where the liquid crystal compound is used in the optical anisotropic layer, the optical anisotropic layer is a layer formed by immobilizing the liquid crystal compound by polymerization or the like, and it is not necessary to exhibit liquid crystallinity anymore after the layer is formed. A polymerizable liquid crystal compound may be a polyfunctional polymerizable liquid crystal compound or a monofunctional polymerizable liquid crystal compound. The liquid crystal compound may be a discotic liquid-crystalline compound, or may be a rod-like liquid crystal compound. In the present invention, the discotic liquid crystal compound is more preferable.

For example, rod-like liquid crystal compounds disclosed in JP1999-513019A (JP-H11-513019A) or JP2007-279688A can be preferably used, and for example, discotic liquid crystal compounds disclosed in JP2007-108732A or JP2010-244038A can be preferably used. However, the present invention is not limited thereto.

In the optical anisotropic layer, it is preferable that the molecules of the liquid crystal compound are immobilized in any one alignment state of a vertical alignment, a horizontal alignment, a hybrid alignment, and a tilt alignment. In order to prepare a phase difference plate having symmetric view angle dependency, it is preferable that a disk surface of the discotic liquid crystal compound is substantially vertical to a film surface (the surface of the optical anisotropic layer), or a long axis of the rod-like liquid crystal compound is substantially horizontal to the film surface (the surface of the optical anisotropic layer). The discotic liquid crystal compound being substantially vertical to the film surface indicates that the average value of an angle between the film surface (the surface of the optical anisotropic layer) and the disk surface of the discotic liquid crystal compound is in a range of 70° to 90°. The angle is more preferably 80° to 90° and is even more preferably 85° to 90°. The rod-like liquid crystal compound being substantially horizontal to the film surface indicates that an angle between the film surface (the surface of the optical anisotropic layer) and a director of the rod-like liquid crystal compound is in a range of 0° to 20°. The angle is more preferably 0° to 10°, and is even more preferably 0° to 5°.

The optical anisotropic layer is able to be formed by applying a coating liquid containing the liquid crystal compound such as the rod-like liquid crystal compound or the discotic liquid crystal compound, and as desired, a polymerization initiator or an alignment control agent, or other additives onto the support. It is preferable that the optical anisotropic layer is formed by forming the alignment layer on the support, and by coating the surface of the alignment layer with the coating liquid.

According to the present invention, it is preferable that the surface of the alignment layer is coated with the composition and molecules of the liquid crystal compound are aligned. Since the alignment layer has a function of specifying the alignment direction of the liquid crystal compound, it is preferable that the alignment layer is used for realizing the preferable aspect of the present invention. However, in a case where the alignment state is immobilized after the liquid crystal compound is aligned, the alignment layer has completed the role thereof, and thus the alignment layer is not essential as a component of the present invention. That is, it is possible to manufacture the polarizing plate of the present invention by transferring only the optical anisotropic layer on the alignment layer in which the alignment state is immobilized to a polarizing layer or a support.

It is preferable that the alignment layer is formed by a rubbing treatment of a polymer.

Examples of the polymer that can be used in the alignment layer include a methacrylate-based copolymer, a styrene-based copolymer, polyolefin, polyvinyl alcohol, modified polyvinyl alcohol, poly(N-methylol acrylamide), polyester, polyimide, a vinyl acetate copolymer, carboxymethyl cellulose, and polycarbonate disclosed in paragraph number in the specification of JP1996-338913A (JP-H08-338913A). A silane coupling agent can be used as a polymer. A water-soluble polymer (for example, poly(N-methylolacrylamide), carboxymethyl cellulose, gelatin, polyvinyl alcohol, and modified polyvinyl alcohol) is preferable, gelatin, polyvinyl alcohol, and modified polyvinyl alcohol are more preferable, and polyvinyl alcohol and modified polyvinyl alcohol are most preferable.

The molecules of the liquid crystal compound are aligned by coating the rubbing treated surface of the alignment layer with the composition. Thereafter, if necessary, it is preferable to form an optical anisotropic layer by causing the alignment layer polymer and the polyfunctional monomer contained in the optical anisotropic layer to react with each other or crosslinking the alignment layer polymer by using a crosslinking agent.

It is preferable that the film thickness of the alignment layer in the range of 0.1 to 10 μm.

The in-plane retardation (Re) of the support (polymer film) supporting the optical anisotropic layer is preferably 0 to 50 nm, more preferably 0 to 30 nm, and even more preferably 0 to 10 nm. It is preferable that Re of the support is set to be in the range described above since a light leakage of reflected light is able to be reduced to the extent of being invisible.

It is preferable that the retardation (Rth) of the film thickness of this support is selected by the combination with the optical anisotropic layer provided on or below the support. Accordingly, it is possible to decrease the light leak of the reflected light or tint attachment in a case of being observed in the oblique direction.

Examples of the material of the polymer film used in the support include the materials used in the λ/4 plate, a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester resin-based film such as polyethylene terephthalate and polyethylene naphthalate, a polyacrylic resin film such as a polyether sulfone film and a polymethyl methacrylate, a polyurethane-based resin film, a polyester film, a polycarbonate film, a polysulfone film, a polyether film, a polymethyl pentene film, a polyether ketone film, a (meth)acrylonitrile film, polyolefin, and a cycloolefin polymer film [for example, trade name "ARTON", manufactured by JSR Corporation, trade name "ZEONOR" and "ZEONEX" manufactured by Zeon Corporation]. Among them, the triacetyl cellulose, the polyethylene terephthalate, and a cycloolefin polymer-based film are preferable, and the triacetyl cellulose is particularly preferable.

A transparent support having a thickness of approximately 5 μm to 150 μm is able to be used, and the thickness of the transparent support is preferably 5 μm to 80 μm, and is more preferably 20 μm to 60 μm. The transparent support may be formed by laminating a plurality of layers. In order to suppress external light reflection, it is preferable as the thickness of the transparent support becomes thinner, but in a case where the thickness is less than 5 μm, the strength of the film becomes weaker, and thus, setting the thickness to be less than 5 μm does not tend to be preferable. In order to enhance adhesion between the transparent support and a layer disposed on the transparent support (the adhesive layer, the vertical alignment layer, or a retardation layer), the transparent support may be subjected to a surface treatment (for example, a glow discharge treatment, a corona discharge treatment, an ultraviolet ray (UV) treatment, and a flame treatment). The adhesive layer (the undercoat layer) may be disposed on the transparent support. It is preferable that a transparent support to which slidability is applied in a transporting step or a transparent support which is formed by applying a polymer layer in which inorganic particles having an average particle diameter of approximately 10 to 100 nm are mixed at a mass ratio of solid contents of 5% to 40% onto one surface of the support or by co-casting with the support in order to prevent a back surface from being bonded to the surface after being wound is used in the transparent support or a long transparent support.

<Adhesive Layer (Pressure Sensitive Adhesive Layer)>

In this specification, "adhesive" is used as the concept which also includes "pressure sensitive adhesive".

It is preferable that, in the optical element according to the present invention, the λ/4 plate and the reflection polarizer are directly in contact with each other or are laminated via an adhesive layer. Any one of direct contact or lamination via an adhesive layer may be selected for the first light reflecting layer, the second light reflecting layer, and the third light reflecting layer that form the reflection polarizer.

Examples of a method of laminating the members to be directly in contact with each other are able to include a method of laminating the members by applying the other member onto one member.

An adhesive layer (pressure sensitive adhesive layer) may be arranged between these members. The pressure sensitive adhesive layer used for laminating the optical anisotropic layer and the polarizing plate, for example, represents a material in which a ratio (tan δ=G"/G') of a modulus of storage elasticity G' and the modulus of loss elasticity G" measured by a dynamic viscoelasticity determination device is 0.001 to 1.5 and includes so-called, a pressure sensitive adhesive or a material that easily creeps.

Examples of the adhesive agent include an aqueous solution of boron compound, a curable adhesive agent of an epoxy compound as disclosed in JP2004-245925A which does not have an aromatic ring in the molecules, an actinic energy ray curable type adhesive agent disclosed in JP2008-174667A which includes a photopolymerization initiator having a molar light absorption coefficient at a wavelength of 360 to 450 nm of greater than or equal to 400 and an ultraviolet ray curable compound as an essential component, an actinic energy ray curable type adhesive agent disclosed in JP2008-174667A which contains (a) a (meth)acrylic compound having two or more (meth)acryloyl groups in the molecules, (b) a (meth)acrylic compound having a hydroxyl group and only one polymerizable double bond in the molecules, and (c) phenol ethylene oxide-modified acrylate or nonyl phenol ethylene oxide-modified acrylate in the total amount of 100 parts by mass of a (meth)acrylic compound, and the like.

An adjustment method of the refractive index of the adhesive layer is not particularly limited, and for example, a method disclosed in JP1999-223712A (JP-H11-223712A) is able to be used. In the method disclosed in JP1999-223712A (JP-H11-223712A), the following aspect is particularly preferable.

Examples of the pressure sensitive adhesive agent which is used in the adhesive layer are able to include resins such as a polyester-based resin, an epoxy-based resin, a polyurethane-based resin, a silicone-based resin, and an acrylic resin. One type of the resin may be independently used or two or more types thereof may be used by being mixed. In particular, the acrylic resin is preferable from the viewpoint of excellent reliability with respect to water resistance, heat resistance, light resistance, and the like, an excellent adhesion force and excellent transparency, and ease of adjusting the refractive index to be suitable for a liquid crystal display. Examples of the acrylic pressure sensitive adhesive agent are able to include a homopolymer or a copolymer of an acrylic monomer such as an acrylic acid and ester thereof, a methacrylic acid and ester thereof, acrylamide, and acrylonitrile, and a copolymer of at least one type of acrylic monomer described above and an aromatic vinyl monomer of vinyl acetate, maleic acid anhydride, styrene, and the like. In particular, a copolymer formed of main monomers such as ethylene acrylate, butyl acrylate, and 2-ethyl hexyl acrylate which exhibits pressure sensitive adhesiveness, a monomer such as vinyl acetate, acrylonitrile, acrylamide, styrene, methacrylate, and methyl acrylate which become an aggregation force component, and functional group-containing monomers such as a methacrylic acid, an acrylic acid, an itaconic acid, hydroxy ethyl methacrylate, hydroxy propyl methacrylate, dimethyl amino ethyl methacrylate, acrylamide, methylol acrylamide, glycidyl methacrylate, and maleic acid anhydride which improve an adhesion force or provide a cross-linking starting point, in which a glass transition point (Tg) is in a range of −60° C. to −15° C., and a weight-average molecular weight is in a range of 200,000 to 1,000,000 is preferable.

In the present invention, a sheet-like light curing type pressure sensitive adhesive (disclosed in Toagosei Group research annual report, 11 TREND 2011 No. 14) can also be used for the adhesive layer. In the same manner as the pressure sensitive adhesive, optical films are easily bonded to each other, crosslinking/curing is performed with ultraviolet rays (UV), modulus of storage elasticity, adhesion force, and heat resistance are improved, and thus the tacky adhesive is a suitable bonding method for the present invention.

<Polarizer>

The optical element according to the present invention may have a polarizer together with the λ/4 plate. Here, the polarizer an absorption type polarizer that transmits the first linearly polarized light and absorbs or reflects the second linearly polarized light orthogonal to the first linearly polarized light, and the angle formed by the slow axis of the λ/4 plate and the absorption axis of the polarizer is preferably 30° to 60°. The polarizer is disposed to face the reflection polarizer with the λ/4 plate interposed therebetween.

It is preferable that a polarizer in which iodine is adsorptively aligned on a polymer film is used as the polarizer described above. The polymer film is not particularly limited, but various polymer films are able to be used. Examples of the polymer film include a hydrophilic polymer film such as a polyvinyl alcohol-based film, a polyethylene terephthalate-based film, an ethylene-vinyl acetate copolymer-based film, a partially saponified film thereof, and a cellulose-based film, a polyene-based orientation film of a dehydration treatment product of polyvinyl alcohol or a dehydrochlorination treatment product of polyvinyl chloride, and the like. Among them, it is preferable that the polyvinyl alcohol-based film having excellent dyeability of iodine is used as the polarizer.

Polyvinyl alcohol or a derivative thereof is used as the material of the polyvinyl alcohol-based film. Examples of the derivative of the polyvinyl alcohol include polyvinyl formal, polyvinyl acetal, and the like, and olefin such as ethylene and propylene, an unsaturated carboxylic acid such as an acrylic acid, a methacrylic acid, and a crotonic acid, and alkyl ester thereof, and an acrylamide-modified derivative.

The degree of polymerization of the polymer which is the material of the polymer film described above is generally 500 to 10,000, is preferably in a range of 1,000 to 6,000, and is more is preferably in a range of 1,400 to 4,000. In a case of a saponification film, the degree of saponification, for example, is preferably greater than or equal to 75 mol %, is more preferably greater than or equal to 98 mol %, and is more preferably in a range of 98.3 mol % to 99.8 mol %, from the viewpoint of the solubility with respect to water.

The polymer film (an unstretched film) is subjected to at least a monoaxial stretching treatment and an iodine dyeing treatment according to a normal method. A boric acid treatment and a washing treatment are able to be performed. The polymer film (a stretched film) which has been subjected to the treatment described above is subjected to a drying treatment and becomes the polarizer according to a normal method.

The thickness of the polarizer is not particularly limited, and is generally 5 to 80 μm, is preferably 5 to 50 μm, and is more preferably 5 to 25 μm.

As the optical properties of the polarizer, in a case where the single transmittance is measured with a single body of the polarizer, the single transmittance is preferably 43% or greater and more preferably in the range of 43.3 to 45.0%. An orthogonal transmittance measured by preparing two polarizers and overlapping two polarizers such that the absorption axes form 90° is preferably smaller. In practice, the orthogonal transmittance is preferably 0.00% to 0.050% and more preferably 0.030% or less. In practice, the degree of polarization is preferably 99.90% to 100% and particularly preferably 99.93% to 100%. Even in a case where the optical properties of the polarizing plate obtained by interposing the polarizer between two sheets of protective films are measured, it is preferable that approximately the same optical properties as those described above are able to be obtained.

<<Method of Manufacturing Optical Element>>

Figure 4:
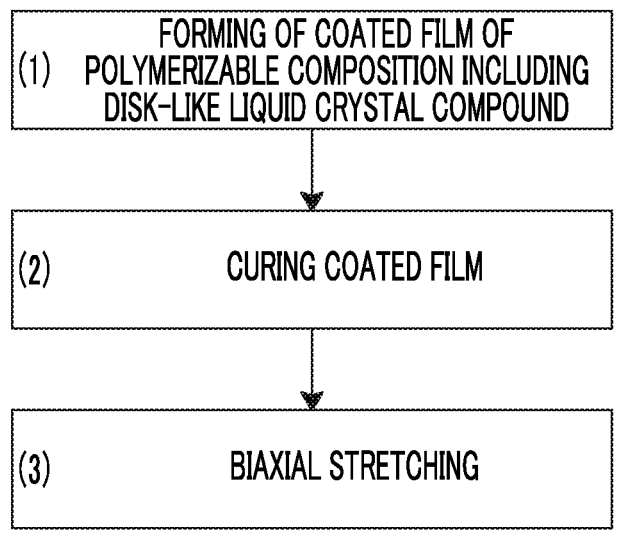
FIG. 4 is a diagram illustrating a manufacturing course in a method of manufacturing the optical element according to the present invention.

The method of manufacturing the optical element according to the present invention is described. FIG. 4 is a method of manufacturing an optical element including a reflection polarizer which is formed of the discotic liquid crystal compound and is obtained by immobilizing the cholesteric liquid crystalline phase, and the reflection polarizer is formed by a step (1) of forming a coating film from the polymerizable composition including the discotic liquid crystal compound, a step (2) of curing the coating film, and a step (3) of biaxially stretching the cured coating film.

According to the method of manufacturing the optical element of the present invention, it is possible to obtain a reflection polarizer having an isotropic refractive index ellipsoid. Accordingly, it is possible to satisfactorily convert the circular polarization to the linearly polarized light with the λ/4 plate without collapsing circular polarization that is transmitted by in the oblique direction by incorporation of the liquid crystal display device with this optical element. Accordingly, the tint change in the oblique direction can be decreased, and further satisfactory oblique brightness can be obtained.

The steps (1) and (2) are repeated twice on one surface of the support, the step (3) is performed, so as to manufacture the laminate of the reflection polarizer of which the lamination number is increased and which is obtained by immobilizing the cholesteric liquid crystalline phase.

In the step (1), first, a coating film is formed of the polymerizable composition (hereinafter, also referred to as a "polymerizable liquid crystal composition" in some cases) including the discotic liquid crystal compound on the support or the substrate or on the surface of the underlayer reflection polarizer. The polymerizable liquid crystal composition is preferably prepared by the coating liquid obtained by dissolving and/or dispersing materials in the solvent. The coating of the coating liquid is able to be performed by various methods such as a wire bar coating method, an extrusion coating method, a direct gravure coating method, a reverse gravure coating method, and a die coating method. The liquid crystal composition is ejected from a nozzle by using an ink jet device, and thus, a coated film is able to be formed.

The polymerizable liquid crystal composition which is applied to the surface and which became the coating film is caused to be in the state of the cholesteric liquid crystalline phase. For example, in an aspect in which the polymerizable liquid crystal composition is prepared as a coating liquid containing a solvent, a state of the cholesteric liquid crystalline phase can be obtained by drying the coating film and removing the solvent in some cases. In order to obtain the transition temperature to the cholesteric liquid crystalline phase, the coating film may be heated, as desired. For example, the state of the cholesteric liquid crystalline phase can be obtained by once heating to the temperature of the isotropic phase and then cooling to the cholesteric liquid crystalline phase transition temperature (phase transition temperature between the isotropic phase and the cholesteric liquid crystal layer), in view of manufacturing suitability or the like, the liquid crystalline phase transition temperature of the polymerizable liquid crystal composition is preferably in a range of 10° C. to 250° C. and is more preferably in a range of 10° C. to 150° C. In a case where the liquid crystalline phase transition temperature is lower than 10° C., a cooling step is not necessary in order to decrease the temperature to a temperature range at which a liquid crystalline phase is exhibited. In view of efficient use of thermal energy, heat resistance of the substrate, and the like, the heating temperature of the coating film is preferably set to 200° C. or less. The heating temperature at this time is film surface temperature and can be measured by PT-2LD manufactured by OPTEX Co. Ltd. and the like.

The forming of the reflection polarizer obtained by immobilizing the cholesteric liquid crystalline phase can be performed by a suitable method such as a method of directly coating the λ/4 plate or other reflection polarizer, via an appropriate alignment layer such as an oblique vapor deposition layer of polyimide, polyvinyl alcohol, SiO2, if necessary, and a method of coating the support which does not change at alignment temperature of liquid crystal formed of a transparent film and the like via an alignment layer, if necessary. A method of overlapping cholesteric liquid crystal layers via an alignment layer may be employed.

The direction of the revolution direction in the cholesteric liquid crystalline phase can be adjusted according to the types of the liquid crystal and the types of the added chiral agent, and the helical pitch (that is, selective reflection wavelength) can be adjusted according to the concentration of these materials. It is known that the wavelength in a specific area that is reflected by each of the reflection polarizers can be shifted by the various causes of the manufacturing method. In addition to the addition concentration of the chiral agent or the like, the reflection polarizers can be shifted in the conditions of a temperature, luminance, an irradiation time, and the like, in a case of immobilizing the cholesteric liquid crystalline phase.

Next, in the step (2), the coating film in the state of cholesteric liquid crystalline phase is irradiated with ultraviolet rays, and the curing reaction proceeds. For ultraviolet irradiation, a light source such as an ultraviolet lamp is used. In this step, the curing reaction of the polymerizable liquid crystal composition progresses by the irradiation with ultraviolet rays, and the cholesteric liquid crystalline phase is immobilized.

There is no particular limitation on the irradiation energy amount of ultraviolet rays, but is preferably about 100 mJ/cm$^2$ to 800 mJ/cm$^2$ generally. The time for irradiating the coating film with ultraviolet rays is not particularly limited, but is determined in view of both sufficient strength and productivity of the cured film.

In order to promote curing reaction, ultraviolet irradiation under the heating condition may be performed. The temperature during ultraviolet irradiation is preferably maintained in the temperature range that exhibits the cholesteric liquid crystalline phase so that the cholesteric liquid crystalline phase is not collapsed. An oxygen concentration in the atmosphere is involved in a degree of polymerization, and does not reach a desired degree of polymerization in the air, and in a case where film hardness is insufficient, it is preferable to decrease the oxygen concentration in the atmosphere by a method such as nitrogen substitution. An oxygen concentration is preferably less than or equal to 10%, is more preferably less than or equal to 7%, and is most preferably less than or equal to 3%. The reaction rate of the curing reaction (for example, a polymerization reaction) which is performed by the ultraviolet irradiation is preferably greater than or equal to 70%, is more preferably greater than or equal to 80%, and is even more preferably greater than or equal to 90% from the viewpoint of retaining the mechanical strength of a layer or suppressing the outflow of an unreacted substance from the layer. In order to improve the reaction rate, a method of increasing the irradiation dose of the ultraviolet ray to be emitted or polymerization under a nitrogen atmosphere or under heating conditions is effective. After the polymerization is performed, a method of maintaining the temperature at a temperature state higher than the polymerization temperature and further performing the reaction through a thermal polymerization reaction or a method of further performing irradiation with ultraviolet rays (however, performing irradiation under conditions satisfying the conditions of the present invention) can also be used. The reaction rate is able to be measured by comparing absorption intensities of infrared vibration spectra of a reactive group (for example, a polymerizable group) before and after the reaction.

Here, with respect to a state in which the liquid crystalline phase is "immobilized", an aspect in which the alignment of the liquid crystal compound which is in the cholesteric liquid crystalline phase is maintained is the most typical and preferable. The state is not limited thereto, and specifically, indicates a state in which the immobilized alignment shape is able to be stably maintained without fluidity in this layer or without a change in the shape of the alignment due to an external field or an external force, in a temperature range of generally 0° C. to 50° C. and in a temperature range of −30° C. to 70° C. under more severe conditions. According to the present invention, it is preferable that the alignment state of the cholesteric liquid crystalline phase is immobilized by the curing reaction performed by ultraviolet ray irradiation.

According to the present invention, it is sufficient that optical properties of the cholesteric liquid crystalline phase are maintained in the layer, and the liquid crystal composition in each reflection polarizer no longer needs to exhibit liquid crystallinity. For example, the liquid crystal composition has a high molecular weight due to the curing reaction, and thus, the liquid crystallinity may not be exhibited anymore.

Finally, in step (3), the cured layer obtained in (2) is biaxially stretched.

As biaxial stretching, well-known methods can be used.

The film having the manufactured coating film having the cholesteric liquid crystalline phase may be longitudinally stretched at a desired stretching ratio in a longitudinal uniaxial stretching machine and then cross-direction stretching may be performed at a desired stretching ratio in a tenter type stretching machine. After the cross-direction stretching, vertical stretching may be performed. Both end portions of the biaxially stretched film may be cut off in front of a winding portion, and wound up by the winding portion, to form a roll film. The stretching ratios in the longitudinal and cross directions are basically the same. However, in the case of shrinking in the width direction in the longitudinal monoaxial stretching, the cross-direction stretching ratio may be increased so that the substantial distortion ratio from the initial stage is equal. Substantial deformation ratios in the longitudinal and cross directions are acceptable, in a case where the difference is within about 5%.

The intake air temperature in a case of stretching, the film surface temperature, and the stretching speed can be appropriately adjusted depending on the desired stretching ratio.

The film surface temperature in a case of stretching is preferably the glass transition point Tg of the support on which the cholesteric liquid crystalline phase is formed Tg−40° C. to Tg+20° C. and more preferably Tg−20° C. to Tg+10° C.

<<Liquid Crystal Display Device>>

Figure 5:
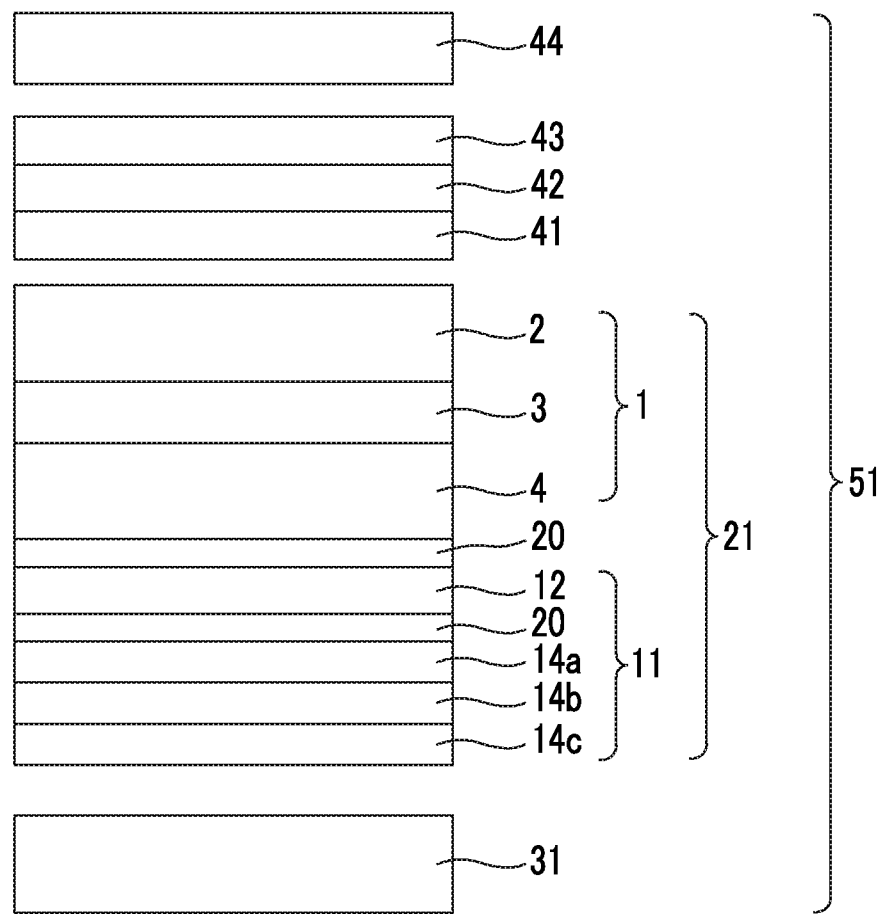
FIG. 5 is a schematic view illustrating a configuration of one embodiment of a liquid crystal display device according to the present invention.

The liquid crystal display device of the present invention is described. FIG. 5 is a schematic view illustrating a configuration of one embodiment of a liquid crystal display device according to the present invention.

As illustrated in FIG. 5, a liquid crystal display device 51 according to the present embodiment includes a backlight unit 31, an optical sheet member 21 including the optical element 11 according to the present invention, a thin layer transistor substrate 41, a liquid crystal cell 42, a color filter substrate 43, and a display side polarizing plate 44. In the optical sheet member 21, the optical element 11 of the present invention is bonded to a backlight-side polarizing plate 1 via the adhesive layer 20. The backlight-side polarizing plate 1 includes a polarizer 3 provided with a polarizing plate protective film 4 and a phase difference film 2.

It is preferable that The backlight unit 31 may include a light source which emits blue light having a light emission center wavelength in a wavelength range of 430 to 480 nm, green light having a light emission center wavelength in a wavelength range of 500 to 600 nm, and red light having at least a part of a light emission intensity peak in a wavelength range of 600 to 700 nm.

The backlight unit 31 preferably includes a reflection member that converts a polarization state of the light reflected on the optical element 11 output from the backlight unit 31 and performs reflection.

In the liquid crystal display device of the present invention, it is preferable that all of the half-widths of the blue light and the green light are 100 nm or less. In the liquid crystal display device of the present invention, it is preferable that the red light has an emission center wavelength in a wavelength range of 600 to 700 nm and the half-width of the red light is 100 nm or less. In an aspect which is a portion of the liquid crystal display device of the present invention, by the combination with red green blue (RGB) narrow band backlight, the color reproducibility can be improved and also sufficient brightness improvement performance can be realized, by the optical element 11 in the above embodiment with a simple configuration of the reflection polarizer obtained by immobilizing the cholesteric liquid crystalline phase which is the RGB light reflecting layer and the λ/4 plate.

In the liquid crystal display device, it is preferable that a layer changing a polarization state of light is arranged between the third light reflecting layer of the optical element and the backlight unit. This is because the layer which changes the polarization state of the light functions as a layer which changes a polarization state of light which is reflected from the reflection polarizer, and brightness can be improved. Examples of the layer changing the polarization state of the light include a polymer layer having a refractive index higher than that of an air layer, and examples of the polymer layer having a refractive index higher than that of the air layer include various low reflection layers such as a hardcoat (HC) treatment layer, an antiglare (AG) treatment layer, and a low reflection (AR) treatment layer, a triacetyl cellulose (TAC) film, an acrylic resin film, a cycloolefin polymer (COP) resin film, a stretched PET film, and the like. The layer changing the polarization state of the light may also function as a support.

A relationship between the average refractive index of the layer which changes the polarization state of the light reflected from the reflection polarizer and the average refractive index of the third light reflecting layer preferably satisfies 0<|Average refractive index of layer which changes polarization state of light−Average refractive index of third light reflecting layer|<0.8, more preferably satisfies 0<|Average refractive index of layer which changes polarization state of light−Average refractive index of third light reflecting layer|<0.4, and even more preferably satisfies 0<|Average refractive index of layer which changes polarization state of light−Average refractive index of third light reflecting layer|<0.2.

The layer which changes the polarization state of the light may be integrated with the optical element, and may be provided to be separated from the optical element.

<Liquid Crystal Cell>

The driving mode of the liquid crystal cell 42 is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode are able to be used. The liquid crystal cell is preferably a VA mode, an OCB mode, an IPS mode, or a TN mode but is not limited thereto. Examples of the configuration of the liquid crystal display device of the VA mode include the configuration illustrated in FIG. 2 of JP2008-262161A. However, the specific structure of the liquid crystal display device is not particularly limited, and well-known configurations can be employed.

<Backlight Unit>

The constitution of the backlight unit may be an edge light mode including a light guide plate or a reflection plate as a configuration member or may be a direct backlight mode.

In the liquid crystal display device of the present invention, the backlight unit includes a reflection member at the rear of the light source, which converts and reflects the polarization state of the light emitted from the light source and reflected by the optical element. The reflection member is not particularly limited, and well-known reflection members may be used and are disclosed in JP3416302B, JP3363565B, JP4091978B, and JP3448626B, and the contents of the publications are incorporated to the present invention.

As an example of the light source of the backlight unit, any one a light source having a blue light emitting diode which emits blue light and a fluorescent material which emits green light and red light in a case where blue light of the blue light emitting diode is incident, a light source of having a UV light emitting diode which emits UV light having an emission center wavelength in a wavelength range of 300 nm or greater and less than 430 nm and a fluorescent material which emits blue light, green light, and red light in a case where the UV light of the UV light emitting diode is incident, a light source (pseudo white light emitting diode (LED)) having a blue light emitting diode which emits blue light and a fluorescent material (a yellow fluorescent body and the like) which emits light having a wide peak from green light to red light in a case where blue light is incident, a blue light emitting diode which emits blue light, a green light emitting diode which emits green light, and a red light emitting diode which emits red light is preferable.

Among these, any one of a light source having a blue light emitting diode which emits blue light in view of energy conversion (power-to-light conversion efficiency) and a fluorescent material which emits green light and red light in a case where blue light of the blue light emitting diode is incident and a light source (pseudo white LED) having blue light emitting diode which emits blue light and a fluorescent material (a yellow fluorescent body and the like) which emits light at a wide peak from green light to red light in a case where blue light is incident is more preferable. In a case of the more preferable aspect of a light source having a blue light emitting diode which emits blue light and a fluorescent material which emits green light and red light in a case where the blue light of the blue light emitting diode is incident, the backlight unit preferably emits blue light having an emission center wavelength in a wavelength range of 430 to 480 nm, a green light having an emission center wavelength in a wavelength range of 500 to 600 nm, and red light having at least a portion of a peak of light emission intensity in a wavelength range of 600 to 700 nm.

Examples of the fluorescent material include an yttrium.aluminum.garnet-based yellow fluorescent body, a terbium.aluminum.garnet-based yellow fluorescent body, and the like. The fluorescent wavelength of the fluorescent material is able to be controlled according to a change in the particle diameter of the fluorescent body.

In the liquid crystal display device of the present invention, it is preferable that the blue light emitting diode emitting the blue light and the fluorescent material emitting the green light and the red light in a case where the blue light of the blue light emitting diode is incident thereon are quantum dot members (for example, quantum dot sheets or bar-like quantum dot bars), and the quantum dot member is arranged between the optical sheet member and a blue light source. Such a quantum dot member is not particularly limited, well-known members can be used. However, for example, JP2012-169271A, SID' 12 DIGEST p. 895, and the like are able to be used, and the contents of these literatures are incorporated in the present invention. A Quantum Dot Enhancement Film (QDEF, manufactured by NanoSys Co., Ltd) is able to be used as such a quantum dot sheet.

It is preferable that the light emission center wavelength of the blue light emitted by the backlight unit is in a wavelength range of 440 to 470 nm.

It is preferable that the light emission center wavelength of the green light emitted by the backlight unit is in a wavelength range of 520 to 570 nm.

It is preferable that the light emission center wavelength of the red light emitted by the backlight unit is in a wavelength range of 600 to 640 nm.

It is preferable that all of the half-widths of the blue light, the green light, and the red light are 100 nm or less.

The half-width of the blue light emitted from the backlight unit preferably has a light emission intensity peak of less than or equal to 80 nm, more preferably has a light emission intensity peak of less than or equal to 70 nm, and particularly preferably has a light emission intensity peak of less than or equal to 30 nm.

The half-width of the green light emitted from the backlight unit preferably has a light emission intensity peak of 80 nm or less, more preferably has a light emission intensity peak of 70 nm or less, and particularly preferably has a light emission intensity peak of 60 nm or less.

The half-width of the red light emitted from the backlight unit preferably has a light emission intensity peak of 80 nm or less, more preferably has a light emission intensity peak of 70 nm or less, and particularly preferably has a light emission intensity peak of 60 nm or less.

It is preferable that the backlight unit further includes well-known diffusion sheets, well-known prism sheets (for example, a brightness enhancement film "BEF" manufactured by 3M Company), and a light guide device. The other members are disclosed in JP3416302B, JP3363565B, JP4091978B, and JP3448626B, and the contents of the publications are incorporated to the present invention.

In order to improve the surface brightness of the liquid crystal display device using the optical element of the present invention, it is preferable that the backlight unit includes two prism sheets, and the directions of the prisms of the two prism sheets are substantially parallel to each other. The expression "directions of the prisms of the two prism sheets are substantially parallel to each other" means that an angle formed by the prisms of the two prism sheets is within ±5°. In the prism sheet, a plurality of protrusions (in this specification, the protrusions are referred to as prisms) projecting one direction of the in-plane of the prism sheet are arranged in a row, and the directions in which a plurality of prisms arranged in a row project are parallel. The direction of the prisms refers to a direction of projection of the plurality of the prisms arranged in a columnar shape.

As a result of diligent research by the inventors, it has been found that the surface brightness of the optical element of the present invention is increased in a case where the directions of the prisms of the two prism sheets are caused to be parallel to each other rather than a case where the directions of the prisms of the two prism sheets are caused to be perpendicular to each other, as described above. It has been found that the same effect can be obtained in a case where any one of the above light sources is combined with the prism sheet.

Figure 6:
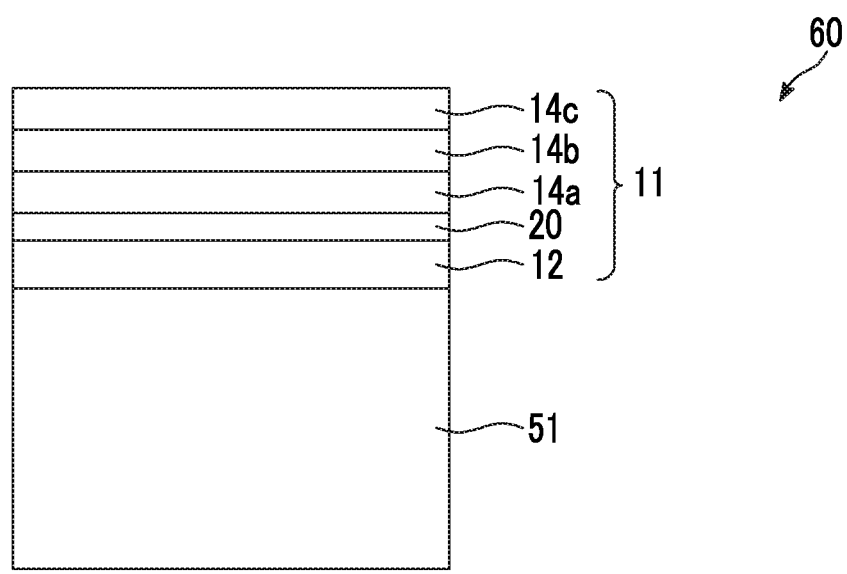
FIG. 6 is a schematic view illustrating a configuration of another embodiment of the liquid crystal display device according to the present invention.

Another embodiment of the liquid crystal display device of the present invention is described. FIG. 6 illustrates a schematic configuration of the liquid crystal display device of the present embodiment.

A liquid crystal display device 60 according to the present embodiment further includes the optical element 11 on a display surface (most visible side) of the liquid crystal display device 51. A liquid crystal display device in another form may be provided on the lower side of the optical element 11, in addition to the liquid crystal display device 51.

According to the present embodiment, the optical element 11 is arranged such that λ/4 is on the display side polarizing plate 44 (see FIG. 5) side.

Here, the optical element of the present invention is used as a reflection film for a mirror with an image displaying function. Since a metal vapor deposition half mirror which is usually used for mirrors with an image display function also reflects a half of the light from the display device side, the brightness decreases. On the other hand, the reflection polarizer of the present invention including a reflection film using a cholesteric liquid crystal layer can transmit light without change by converting the linearly polarized light from the display device to the circular polarization with the λ/4 plate and thus it is possible to obtain twice the brightness of the metal vapor deposition half mirror.

Even in a case where it is desired to use a conventional cholesteric liquid crystal layer which have been used without stretching in the related art as a reflection film for the mirror with an image displaying function, there was a problem in that the circular polarization collapses due to oblique retardation of a cholesteric layer, the transmittance of each wavelength changes, and the tint changes. However, the optical element of the present invention has small oblique retardation, and thus it is possible to perform a high brightness display without tint change.

EXAMPLES

Hereinafter, characteristics of the present invention are more specifically described with reference to the examples and comparative examples. A material, an amount used, a treatment detail, a treatment order, and the like provided in the examples can be suitably changed without departing from the gist of the present invention. The scope of the present invention should not be construed in a limited manner by the specific examples.

<Preparation of Polarizer>

A polarizer was manufactured in the same manner as in [0219] of JP2006-293275A.

Example 1

<Manufacturing of Temporary Support>

Pellets of [a mixture of 90 parts by mass of an acrylic resin having a lactone ring structure represented by Formula (II) {Copolymerization monomer mass ratio=methyl methacrylate/methyl 2-(hydroxymethyl) acrylate=8/2, a lactone cyclization ratio: about 100%, a content of a lactone ring structure: 19.4%, weight-average molecular weight: 133, 000, a melt flow rate: 6.5 g/10 min (240° C., 10 kgf), Tg 131° C.} and 10 parts by mass of an acrylonitrile-styrene (AS) resin {TOYO AS AS20, manufactured by Toyo-Styrene Co., Ltd.}; Tg 127° C.] were supplied to a biaxial extruder and were melted and extruded in a sheet form at about 280° C., to obtain a long temporary support having a thickness of 40 μm.

(II)

In Formula (II), $R^1$ is a hydrogen atom, and $R^2$ and $R^3$ are methyl groups.

<Forming of Alignment Layer>

The temporary support was continuously coated with an alignment layer coating liquid (A) in the following composition with a #14 wire bar. The solution was dried with warm air at 60° C. for 60 seconds and was further dried with hot air at 100° C. for 120 seconds. The degree of saponification of the modified polyvinyl alcohol used was 96.8%.

—Composition of Alignment Layer Coating Liquid (A)—

| | |
|---|---|
| Modified polyvinyl alcohol below | 10 parts by mass |
| Water | 308 parts by mass |
| Methanol | 70 parts by mass |
| Isopropanol | 29 parts by mass |
| Photopolymerization initiator (IRGACURE (registered trademark) 2959, manufactured by BASF SE) | 0.8 parts by mass |

Modified polyvinyl alcohol

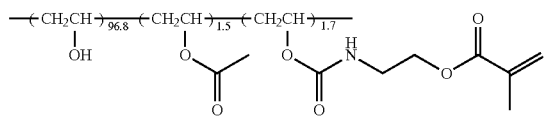

The composition ratio of modified polyvinyl alcohol was the mole fraction.

A rubbing treatment was continuously performed on the alignment layer manufactured above. At this point, the longitudinal direction and the transportation direction of the long film were parallel to each other, and an angle formed by the longitudinal direction of the film and the rotational axis of the rubbing roller was set to about 45°.

<Forming of Reflection Polarizer>

A reflection polarizer obtained by immobilizing the cholesteric liquid crystalline phase using the discotic liquid crystal compound as a cholesteric liquid crystal material in the following method was formed on the alignment layer.

The concentration of the following coating liquid was adjusted such that a dry film thickness after stretching became 3.5 μm, was dissolved in methyl ethyl ketone (MEK), and a coating liquid for forming a reflection polarizer containing a discotic liquid crystal compound was prepared. The bar-coating was performed on the above alignment layer with this coating liquid, and the coating liquid was heated and aged at 85° C. for one minute, so as to obtain a uniform alignment state. Thereafter, this coated film was maintained at 45° C., and was irradiated with 300 mJ/cm$^2$ of ultraviolet rays by using a metal halide lamp, so as to form a reflection polarizer.

Coating Liquid for Reflection Polarizer of Example 1

| | |
|---|---|
| Sum of discotic liquid crystal compound 101 and discotic liquid crystal compound 102 | 100 parts by mass |
| Surfactant 1 | 0.45 parts by mass |
| Polymerization initiator 1 | 3 parts by mass |
| Chiral Agent 1 (an amount in which reflection center wavelength after stretching was 480 ± 36 nm) | 4.2 parts by mass |

Surfactant 1

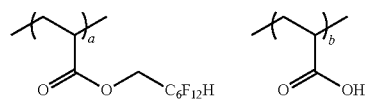

a/b = 98/2

In the structural formula of Surfactant 1, the description of a/b = 98/2 indicates a of 98 mass percents and b of 2 mass percents.

Polymerizable Initiator 1

Chiral Agent 1

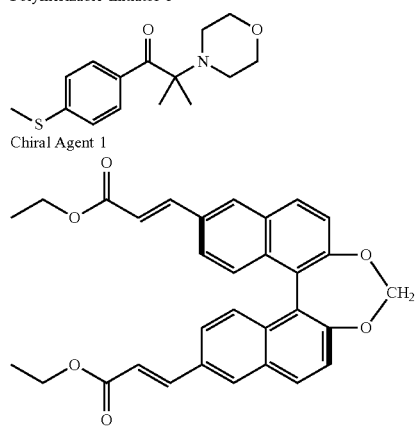

<Manufacturing of Biaxially Stretched Cholesteric Liquid Crystal Film>

The manufactured reflection polarizer was longitudinally stretched in a longitudinal uniaxial stretching machine at a stretching ratio (10%) presented in Table 1 at an air supply temperature of 150° C., a film surface temperature of 140° C., and a stretching ratio of 30%/min Thereafter, in a tenter type stretching machine, cross-direction stretching was performed at the stretching ratio (10%) presented in Table 1 at an air supply temperature of 150° C., the film surface temperature of 140° C., and a stretching speed of 30%/min, and both end portions were cut off in front of a winding portion, and wound up as a roll film having a length of 4,000 m, so as to obtain a biaxial stretching cholesteric liquid crystal film. The stretched reflection polarizer of this liquid crystal film may be simply referred to as a reflection polarizer.

Examples 2 to 16

A reflection polarizer was formed in the same manner as in Example 1 except for adjusting the addition amount of the chiral agent so that the reflection wavelength was as presented in Table 1 and causing the biaxial stretching conditions to be as presented in Table 1.

Comparative Examples 1 to 7

A reflection polarizer was formed in the same manner as in Example 1 except for adjusting the addition amount of the chiral agent so that the reflection wavelength was as presented in Table 1 and causing the stretching conditions to be as presented in Table 1. In the unstretched example, the film thickness after stretching means the film thickness after curing.

Comparative Example 8

PET (thickness 75 μm) manufactured by Fujifilm Corporation was prepared as the temporary support, and a rubbing treatment was continuously performed. The direction of the rubbing treatment was parallel to the longitudinal direction of the film. As the temporary support, in addition to the PET film, it was checked that a general PET film (for example, COSMOSHINE A4100 (Toyobo Co., Ltd.)).

The concentration of the following coating liquid was adjusted such that a dry film thickness became 3.5 μm, was dissolved in MEK, and a coating liquid for forming a reflection polarizer containing a rod-like liquid crystal compound was prepared. The bar-coating was performed on the rubbing treated temporary support with this coating liquid, and the coating liquid was heated and aged at 85° C. for one minute, so as to obtain a uniform alignment state. Thereafter, this coated film was maintained at 45° C., and was irradiated with 300 mJ/cm² of ultraviolet rays by using a metal halide lamp, so as to cure the coated film.

Coating Liquid for Reflection Polarizer of Comparative Example 8

| | |
|---|---|
| Sum of rod-like compound 18-1 and rod-like compound 18-2 | 100 parts by mass |
| Fluorine-based horizontal alignment agent 1 | 0.05 parts by mass |
| Fluorine-based horizontal alignment agent 2 | 0.01 parts by mass |
| Right-handed chiral agent LC756 (manufactured by BASF SE) | 6.1 parts by mass |
| Polyfunctional monomer A-TMMT (manufactured by Shin-Nakamura Chemical Co., Ltd.) | 1 part by mass |
| Polymerization initiator IRGACURE819 (manufactured by BASF SE) | 3 parts by mass |

Rod-like Compound 18-1

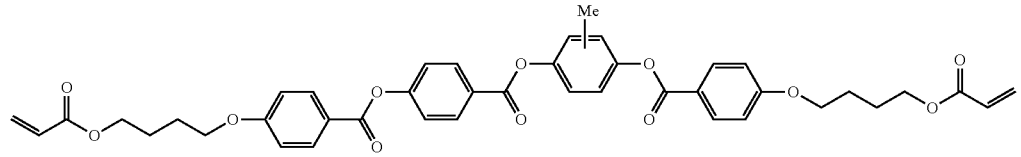

Rod-like Compound 18-2

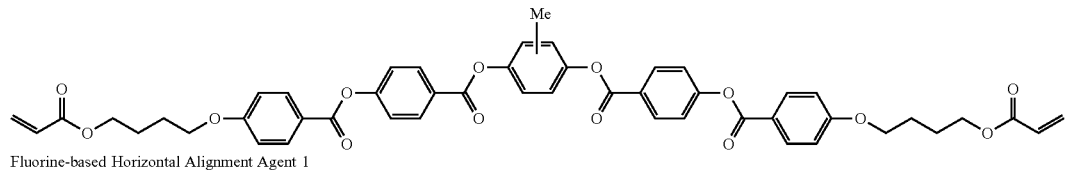

Fluorine-based Horizontal Alignment Agent 1

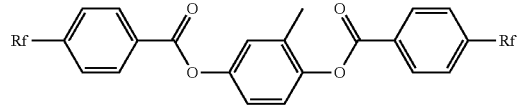

Fluorine-based Horizontal Alignment Agent 2

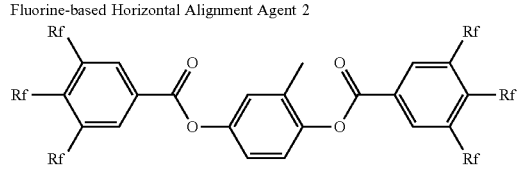

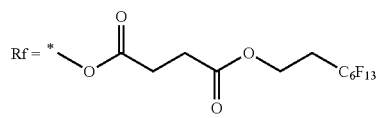

Comparative Examples 9 to 13

A reflection polarizer was prepared in the same manner as in Comparative Example 8 except for causing the addition amount of the chiral agent and the stretching conditions to be as presented in Table 1.

Examples 21 to 26

As presented in Table 2, the reflection polarizers of Example 1 to 16 were laminated as a blue reflection layer (first light reflecting layer), a green reflection layer (second light reflecting layer), and a red reflection layer (third light reflecting layer), so as to form optical elements of Example 21 to 25 which include reflection polarizers including a plurality of light reflecting layers and which is obtained by laminating a λ/4 plate and a polarizer. An optical element of Example 26 including a reflection polarizer obtained by further laminating infrared reflection layer (fourth light reflecting layer) to the configuration of Example 23 was manufactured.

Hereinafter, a method of laminating first to third light reflecting layers is described.

The second light reflecting layer and the third light reflecting layer each were manufactured on the temporary support. A commercially available acrylic adhesive (UV-3300 manufactured by Toagosei Co., Ltd.) was coated on the second light reflecting layer. This coated surface was directly adhered to the first light reflecting layer, and the temporary support was peeled after the adhesive was cured by being irradiated with ultraviolet rays in an irradiation dose of 100 mJ/cm² from the temporary support side using a metal halide lamp. The third light reflecting layer was bonded thereto, in the same manner as the second light reflecting layer. The obtained reflection polarizer was obtained by laminating a first light reflecting layer, an adhesive layer, a second light reflecting layer, an adhesive layer, a third light reflecting layer, and a temporary support, in this order, on the temporary support.

<Lamination of λ/4 Plate>

As the λ/4 plate, a "QL film" manufactured by Fujifilm Corporation was used. This is a film provided with a discotic liquid crystal compound layer on cellulose support. Re (550) of film=125 nm and Rth (550)=1 nm were satisfied.

The temporary support on the side of the first light reflecting layer was peeled off, the cellulose support side of this λ/4 plate was bonded to the first light reflecting layer of the reflection polarizer in the same manner as the light reflecting layer, and the temporary support of the third light reflecting layer was peeled off, so as to obtain a reflection polarizer with a λ/4 plate.

The reflection polarizer with the λ/4 plate manufactured above was bonded to one side of the previously prepared polarizer, so that the λ/4 plate was on the polarizer side, and a commercially available cellulose acylate-based film "TD80UL" (manufactured by Fujifilm Corporation) as the polarizing plate protective film was bonded to the other side, to manufacture an optical element. That is, the optical elements of Examples 21 to 25 each were a lamination layer structure body obtained by laminating the third light reflecting layer, the adhesive layer, the second light reflecting layer, the adhesive layer, the first light reflecting layer, the adhesive layer, the λ/4 plate, the adhesive layer, the polarizer, and the polarizing plate protective film, in this order.

The optical element of Example 26 further included an infrared reflection layer (fourth light reflecting layer) via an adhesive layer on the third light reflecting layer side, and was manufactured by the same method.

Comparative Examples 21 to 25

As illustrated in Table 2, the reflection polarizers of Comparative Example 1 to 13 each were laminated as the blue reflection layer (first light reflecting layer), the green reflection layer (second light reflecting layer), and the red reflection layer (third light reflecting layer), in the same manner as in Examples 21 to 25, so as to manufacture optical elements of Comparative Examples 21 to 24. In the same manner as in Example 26, Comparative Example 25 further including an infrared reflection layer (fourth light reflecting layer) was manufactured.

[Evaluation]

<Method of Measuring In-Plane Retardation Value Re>

With respect to Examples 1 to 16 and Comparative Examples 1 to 13, in-plane retardation values Re were measured in the following method.

After the reflection polarizer was formed, the reflection polarizer was bonded to the glass plate using the acrylic adhesive, the temporary support was peeled off, and the optical properties were measured by spectral measurement of Axoscan. Among them, the reflection center wavelength was obtained from the spectrum of "Transmittance". The average value of "Linear Retardance (nm)" at +50 nm and −50 nm of the obtained reflection center wavelength was set as Re.

<Method of Measuring Oblique Ret (50°)>

With respect to Examples 1 to 16 and Comparative Examples 1 to 13, oblique Ret (50°) was measured by the following method.

A spectrum measurement was performed in the same manner as in Re except for causing the stage of Axoscan to be oblique by 50° with the slow axis obtained during Re measurement as the axis, so as to measure optical properties. Among them, an average value of "Linear Retardance (nm)" at +50 nm and −50 nm of the reflection center wavelength obtained from the "Transmittance" spectrum was set as Ret (50°).

<Manufacturing of Backlight-Side Polarizing Plate for Evaluation>

With respect to Examples 1 to 16 and Comparative Examples 1 to 13, backlight-side polarizing plates for evaluation were manufactured. A commercially available cellulose acylate-based film "TD80UL" (manufactured by Fujifilm Corporation) was adhered to both sides of the prepared polarizer to obtain a laminate. The reflection polarizers obtained in Examples 1 to 16 and Comparative Examples 1 to 13 each were bonded to one surface of the laminate with an adhesive, and the temporary supports were peeled off, so as to obtain backlight-side polarizing plates for evaluation. That is, the backlight-side polarizing plate for evaluation was a lamination layer structure body of the reflection polarizer of Examples 1 to 16 or Comparative Examples 1 to 13, the cellulose acylate-based film, the polarizer, and the cellulose acylate film.

<Manufacturing of Liquid Crystal Display Device>

A commercially available liquid crystal display device (manufactured by Panasonic Corporation, trade name TH-L42D2) was disassembled and the backlight-side polarizing plate was changed as follows to assemble a liquid crystal display device for evaluation.

With respect to Examples 1 to 16 and Comparative Examples 1 to 13, the backlight-side polarizing plate for evaluation manufactured as described above was bonded to a cell of the disassembled liquid crystal display device such that the reflection polarizer of the examples or the comparative examples was on the backlight-side, so as to assemble a liquid crystal display device for evaluation.

With respect to Examples 21 to 26 and Comparative Examples 21 to 25, the optical element manufactured in each example was bonded to the cell of the disassembled liquid crystal display device such that the reflection polarizer was on the backlight-side, so as to assemble a liquid crystal display device for evaluation.

<Measuring of Tint Change Δu'v' (50°) Around 50°>

The tint coordinates u'v' were measured by using a measurement machine (EZ-Contrast 160D, manufactured by ELDIM Corporation). The measurement angle was immobilized in the polar angle direction of 50°, and the azimuthal angle was rotated by 360° in 15° increments to measure values of the tint coordinates u' and v', so as to calculate a tint change Δu'v' (50°) taking a difference between the maximum and the minimum. Evaluation was performed based on the following evaluation standard using the values as evaluation indexes.

Evaluation of Examples 1 to 16 and Comparative Examples 1 to 13

The reflection polarizers that reflect blue light in Examples 1 to 5 and Comparative Examples 5, 8, and 11 were evaluated by using Comparative Example 1 as a standard (Standard 1-1).

The reflection polarizers that reflect green light in Examples 6 to 10 and Comparative Examples 6, 9, and 12 were evaluated by using Comparative Example 2 as a standard (Standard 1-2).

The reflection polarizers that reflect red light in Examples 11 to 15, and Comparative Examples 7, 10, and 13 were evaluated by using Comparative Example 3 as a standard (Standard 1-3).

The reflection polarizers that reflect infrared light in Example 16 was evaluated by using Comparative Example 4 as a standard (Standard 1-4).

Examples 1 to 16 and Comparative Examples 5 to 13 were evaluated as follows based on the above standards.

A: Satisfactory by 40% or more than the oblique tint change of the liquid crystal display device using the standard B: Satisfactory by 25% or more and less than 40% than the oblique tint change of the liquid crystal display device using the standard C: Satisfactory by 10% or more and less than 25% than the oblique tint change of the liquid crystal display device using the standard D: Equal to or less than the oblique tint change of the liquid crystal display device using the standard Evaluation of Examples 21 to 26 and Comparative Examples 21 to 25

Examples 21 to 25, and Comparative Examples 22 to 24 were evaluated by using Comparative Example 21 as a standard (Standard 2-1).

Example 26 was evaluated by using Comparative Example 25 as a standard (Standard 2-2).

Examples 21 to 26 and Comparative Examples 22 to 24 were evaluated as follows based on the above standards.

A: Satisfactory by 40% or more than the oblique tint change of the liquid crystal display device of the standard B: Satisfactory by 25% or more and less than 40% than the oblique tint change of the liquid crystal display device of the standard C: Satisfactory by 10% or more and less than 25% than the oblique tint change of the liquid crystal display device of the standard D: Equal to or less than the oblique tint change of the liquid crystal display device of the standard <Method of Measuring Oblique Brightness>

The surface brightness of a liquid crystal display device using the optical elements of Examples 21 to 26 and Comparative Examples 21 to 25 in a case of a white display was measured by using a measuring machine (EZ-Contrast 160D, manufactured by ELDIM S.A.). The results were evaluated based on the standards below. In order to match the number of lamination layers of the evaluation light source and the reflection polarizer, Examples 21 to 25 and Comparative Examples 22 to 24 were evaluated based on Comparative Example 21, and Example 26 was evaluated based on Comparative Example 25. The results were evaluated as below.

A: Satisfactory by 40% or more than the oblique brightness of the standard liquid crystal display device B: Satisfactory by 25% or more and less than 40% than the oblique brightness of the standard liquid crystal display device C: Satisfactory by 10% or more and less than 25% than the oblique brightness of the standard liquid crystal display device D: Equal to or less than the oblique brightness of the standard liquid crystal display device Examples 31 and 32

In the same manner as in Example 21, as presented in Table 3, the reflection polarizers formed in Examples 1 to 16 were laminated as a blue reflection layer (first light reflecting layer), a green reflection layer (second light reflecting layer), and a red reflection layer (third light reflecting layer), and the reflection polarizer including a plurality of light reflecting layers was formed and was laminated with a λ/4 plate, so as to form an optical element of Example 31. In Example 31, an optical element of Example 32 further including an infrared reflection layer (fourth light reflecting layer) between the red reflection layer and the λ/4 plate was formed.

Comparative Examples 31 to 33

In the same manner as in Comparative Example 21, as presented in Table 3, the reflection polarizers of Comparative Examples 1 to 13 each were laminated as a blue reflection layer (first light reflecting layer), a green reflection layer (second light reflecting layer), and a red reflection layer (third light reflecting layer), and the reflection polarizer including a plurality of light reflecting layers was formed and was laminated with a λ/4 plate, so as to form optical elements of Comparative Examples 31 and 32. In Comparative Example 31, an optical element of Comparative Example 33 further including an infrared reflection layer (fourth light reflecting layer) between the red reflection layer and the λ/4 plate was formed.

<Manufacturing of Mirror with Image Display Function>

The optical elements of Examples 31 and 32 and Comparative Examples 31 to 33 were bonded to the visible side surface of a commercially available liquid crystal display device (manufactured by Panasonic Corporation, trade name TH-L42D2), such that the λ/4 plate was on the liquid crystal display device side, and a slow axis of the λ/4 plate and an absorption axis of the liquid crystal display device on the visible side polarizing plate forms 45°, so as to form a mirror with an image display function.

<Measuring of Tint Change Δu'v' (50°) Around 50°>

The tint coordinates u'v' were measured by using a measurement machine (EZ-Contrast 160D, manufactured by ELDIM Corporation). The measurement angle was immobilized in the polar angle direction of 50°, and the azimuthal angle was rotated by 360° in 15° increments to measure values of the tint coordinates u' and v', so as to calculate a tint change Δu'v' (50°) taking a difference between the maximum and the minimum. Evaluation was performed based on the following evaluation standard using the values as evaluation indexes.

Evaluation of Examples 31 and 32 and Comparative Examples 31 to 33

Example 31 and Comparative Example 32 were evaluated by using Comparative Example 31 as a standard (Standard 3-1), and Example 32 was evaluated by using Comparative Example 33 as a standard (Standard 3-2) as below.

A: Satisfactory by 40% or more than oblique tint change of a mirror with an image display function including a standard optical element B: Satisfactory by 25% or more and less than 40% than oblique tint change of a mirror with an image display function including a standard optical element C: Satisfactory by 10% or more and less than 25% than oblique tint change of a mirror with an image display function including a standard optical element D: Equal to or less than oblique tint change of a mirror with an image display function including a standard optical element <Method of Measuring Oblique Brightness>

As the oblique brightness of the mirror with an image display function using the optical elements of Examples 31 and 32 and Comparative Examples 31 to 33, the oblique brightness during a white display was measured by immobilizing the measurement angle in the polar angle direction of 50° and rotating the azimuthal angle by 360° in 15° increments by using a measuring machine (EZ-Contrast 160D, manufactured by ELDIM S.A.). The results were evaluated based on the standards below. In order to match the evaluation light sources, Example 31 and Comparative Example 32 were evaluated by using Comparative Example 31 as a standard (Standard 3-1), and Example 32 was evaluated by using Comparative Example 33 as a standard (Standard 3-2) as below.

A: Satisfactory by 40% or more than oblique brightness of a mirror with an image display function using Comparative Example 17

B: Satisfactory by 25% or greater and less than 40% than oblique brightness of a mirror with an image display function using Comparative Example 17

C: Satisfactory by 10% or greater and less than 25% than oblique brightness of a mirror with an image display function using Comparative Example 17

D: Equal to or less than oblique brightness of a mirror with an image display function using Comparative Example 17

TABLE 1

| | Liquid crystal substance | Chiral agent addition amount (part by mass) | Stretching condition | Film thickness after stretching (μm) | Reflection wavelength (nm) | Re (nm) | Oblique Ret (50°) (nm) | Tint change Δu 'v' around 50° (50°) |
|---|---|---|---|---|---|---|---|---|
| Example 1 | Discotic Compound 101, Discotic Compound 102 | 4.2 | Biaxial stretching ratio 10% | 3.5 | 480 ± 36 | 0 | −40 | C |
| Example 2 | Discotic Compound 101, Discotic Compound 102 | 3.8 | Biaxial stretching ratio 15% | 3.7 | 480 ± 33 | 0 | −23 | B |
| Example 3 | Discotic Compound 101, Discotic Compound 102 | 3.4 | Biaxial stretching ratio 20% | 4.1 | 480 ± 28 | 0 | −4 | A |
| Example 4 | Discotic Compound 101, Discotic Compound 102 | 3.1 | Biaxial stretching ratio 25% | 3.8 | 480 ± 23 | 0 | 20 | B |
| Example 5 | Discotic Compound 101, Discotic Compound 102 | 2.9 | Biaxial stretching ratio 30% | 3.8 | 480 ± 18 | 0 | 35 | C |
| Example 6 | Discotic Compound 101, Discotic Compound 102 | 3.5 | Biaxial stretching ratio 10% | 3.8 | 560 ± 36 | 0 | −40 | C |
| Example 7 | Discotic Compound 101, Discotic Compound 102 | 3.2 | Biaxial stretching ratio 15% | 3.5 | 560 ± 33 | 0 | −24 | B |
| Example 8 | Discotic Compound 101, Discotic Compound 102 | 2.9 | Biaxial stretching ratio 20% | 3.6 | 560 ± 28 | 0 | −2 | A |
| Example 9 | Discotic Compound 101, Discotic Compound 102 | 2.6 | Biaxial stretching ratio 25% | 3.5 | 560 ± 22 | 0 | 23 | B |
| Example 10 | Discotic Compound 101, Discotic Compound 102 | 2.4 | Biaxial stretching ratio 30% | 3.5 | 560 ± 18 | 0 | 39 | C |
| Example 11 | Discotic Compound 101, Discotic Compound 102 | 3.0 | Biaxial stretching ratio 10% | 3.2 | 640 ± 38 | 0 | −50 | C |
| Example 12 | Discotic Compound 101, Discotic Compound 102 | 2.7 | Biaxial stretching ratio 15% | 3.6 | 640 ± 34 | 0 | −29 | B |
| Example 13 | Discotic Compound 101, Discotic Compound 102 | 2.5 | Biaxial stretching ratio 20% | 3.8 | 640 ± 29 | 0 | −4 | A |
| Example 14 | Discotic Compound 101, Discotic Compound 102 | 2.3 | Biaxial stretching ratio 25% | 3.6 | 640 ± 25 | 0 | 24 | B |
| Example 15 | Discotic Compound 101, Discotic Compound 102 | 2.1 | Biaxial stretching ratio 30% | 3.7 | 640 ± 20 | 0 | 41 | C |
| Example 16 | Discotic Compound 101, Discotic Compound 102 | 2.3 | Biaxial stretching ratio 20% | 3.6 | 750 ± 30 | 0 | 3 | A |
| Comparative Example 1 | Discotic Compound 101, Discotic Compound 102 | 5.1 | No stretching | 3.5 | 480 ± 40 | 0 | −80 | Standard 1-1 |
| Comparative Example 2 | Discotic Compound 101, Discotic Compound 102 | 4.3 | No stretching | 3.7 | 560 ± 42 | 0 | −91 | Standard 1-2 |
| Comparative Example 3 | Discotic Compound 101, Discotic Compound 102 | 3.7 | No stretching | 3.5 | 640 ± 43 | 0 | −87 | Standard 1-3 |
| Comparative Example 4 | Discotic Compound 101, Discotic Compound 102 | 3.1 | No stretching | 3.5 | 750 ± 48 | 0 | −90 | Standard 1-4 |
| Comparative Example 5 | Discotic Compound 101, Discotic Compound 102 | 4.2 | Monoaxial stretching ratio 20% | 3.3 | 480 ± 29 | 81 | −24 | D |
| Comparative Example 6 | Discotic Compound 101, Discotic Compound 102 | 3.5 | Monoaxial stretching ratio 20% | 3.6 | 560 ± 28 | 83 | −28 | D |
| Comparative Example 7 | Discotic Compound 101, Discotic Compound 102 | 3.1 | Monoaxial stretching ratio 20% | 3.5 | 640 ± 30 | 79 | −31 | D |

TABLE 1-continued

|  | Liquid crystal substance | Chiral agent addition amount (part by mass) | Stretching condition | Film thickness after stretching (μm) | Reflection wavelength (nm) | Re (nm) | Oblique Ret (50°) (nm) | Tint change Δu 'v' around 50° (50°) |
|---|---|---|---|---|---|---|---|---|
| Comparative Example 8 | Rod-like Compound 18-1, Rod-like Compound 18-2 | 6.1 | No stretching | 3.5 | 480 ± 40 | 0 | 70 | D |
| Comparative Example 9 | Rod-like Compound 18-1, Rod-like Compound 18-2 | 5.6 | No stretching | 3.4 | 560 ± 43 | 0 | 81 | D |
| Comparative Example 10 | Rod-like Compound 18-1, Rod-like Compound 18-2 | 5.0 | No stretching | 3.4 | 640 ± 43 | 0 | 78 | D |
| Comparative Example 11 | Rod-like Compound 18-1, Rod-like Compound 18-2 | 4.6 | Biaxial stretching ratio 20% | 3.3 | 480 ± 41 | 0 | 122 | D |
| Comparative Example 12 | Rod-like Compound 18-1, Rod-like Compound 18-2 | 3.8 | Biaxial stretching ratio 20% | 3.5 | 560 ± 42 | 0 | 117 | D |
| Comparative Example 13 | Rod-like Compound 18-1, Rod-like Compound 18-2 | 3.0 | Biaxial stretching ratio 20% | 3.4 | 640 ± 42 | 0 | 131 | D |

TABLE 2

| | | | Comparative Example 21 | Comparative Example 22 | Comparative Example 23 | Comparative Example 24 | Comparative Example 25 | Example 21 | Example 22 | Example 23 | Example 24 | Example 25 | Example 26 |
|---|---|---|---|---|---|---|---|---|---|---|---|---|---|
| Configuration | λ/4 plate | | Exist | Exist | Exist | Exist | Exist | Exist | Exist | Exist | Exist | Exist | Exist |
| | Reflection polarizer | Blue | Comparative Example 1 | Comparative Example 5 | Comparative Example 8 | Comparative Example 11 | Comparative Example 1 | Example 1 | Example 2 | Example 3 | Example 4 | Example 5 | Example 3 |
| | | Green | Comparative Example 2 | Comparative Example 6 | Comparative Example 9 | Comparative Example 12 | Comparative Example 2 | Example 6 | Example 7 | Example 8 | Example 9 | Example 10 | Example 8 |
| | | Red | Comparative Example 3 | Comparative Example 7 | Comparative Example 10 | Comparative Example 13 | Comparative Example 3 | Example 11 | Example 12 | Example 13 | Example 14 | Example 15 | Example 13 |
| | | Infrared | — | — | — | — | Comparative Example 4 | — | — | — | — | — | Example 16 |
| Effect | Oblique tint Δu 'v' | | Standard 2-1 | D | D | D | Standard 2-2 | C | B | A | B | C | A |
| | Oblique brightness | | Standard 2-1 | D | D | D | Standard 2-2 | C | B | A | B | C | A |

TABLE 3

| | | | Comparative Example 31 | Comparative Example 32 | Comparative Example 33 | Example 31 | Example 32 |
|---|---|---|---|---|---|---|---|
| Configuration | λ/4 plate | | Exist | Exist | Exist | Exist | Exist |
| | Reflection polarizer | Blue | Comparative Example 1 | Comparative Example 7 | Comparative Example 1 | Example 3 | Example 3 |
| | | Green | Comparative Example 2 | Comparative Example 8 | Comparative Example 2 | Example 8 | Example 8 |
| | | Red | Comparative Example 3 | Comparative Example 9 | Comparative Example 3 | Example 13 | Example 13 |
| | | Infrared | — | — | Comparative Example 4 | — | Example 16 |
| Effect | Oblique tint Δu 'v' | | Standard 3-1 | D | Standard 3-2 | A | A |
| | Oblique brightness | | Standard 3-1 | D | Standard 3-2 | A | A |

As presented in Examples 1 to 16 of Table 1, even in a case where the optical element of the present invention is a single layer, Re was 0 nm, an absolute value |Ret (50°)| of the oblique retardation value Ret was 50 nm or greater, and all was able to be evaluated as C or greater in the oblique tint change.

It was understood that, in a case where |Ret| was 10 nm or less, the tint change amount around 50° was minimum.

In a case where stretching was not performed in Comparative Examples 1 to 4, it is considered that, Re was 0 nm, an absolute value of the oblique Ret (50°) was 50 nm or greater, and thus the tint change around 50° was deteriorated.

In a case of monoaxial stretching of Comparative Examples 5 to 7, it is considered that, the absolute value |Ret (50°)| of the oblique Ret (50°) was 50 nm or less, but Re was great, and thus the tint change around 50° was deteriorated.

In Comparative Examples 8 to 13 using the rod-like liquid crystal compound, it is considered that, an absolute value of the oblique Ret (50°) was greatly deviated from the scope of the present invention in a case where stretching was not performed and in a case where biaxial stretching was performed, and thus the tint change around 50° was deteriorated.

In Table 2, as presented in Examples 21 to 25, the reflection polarizer obtained by laminating three layers of blue, green, and red was evaluated as C or greater in the oblique tint change, and the oblique tint change of each color was small, and thus a result which is excellent in the oblique brightness was obtained.

In Examples 23 and 26, each layer having a small tint change amount around 50° was laminated, and thus oblique brightness was high.

As illustrated in Table 3, in Examples 31 and 32, it is possible to obtain a result in which oblique tint and oblique brightness were satisfactory compared with Comparative Examples 31 to 33, and thus it is clear that the optical element of the present invention is satisfactory as a mirror with an image display function.

EXPLANATION OF REFERENCES

1: backlight-side polarizing plate
2: phase difference film
3: polarizer
4: polarizing plate protective film
11: optical element
12: λ/4 plate
13: reflection polarizer
14a: first light reflecting layer
14b: second light reflecting layer
14c: third light reflecting layer
20: adhesive layer (adhesive)
21: optical sheet member
31: backlight unit
41: thin layer transistor substrate
42: liquid crystal cell
43: color filter substrate
44: display side polarizing plate
51, 60: liquid crystal display device

What is claimed is:

1. An optical element comprising:
a reflection polarizer which is formed of a discotic liquid crystal compound and in which a cholesteric liquid crystalline phase is immobilized,
wherein, in the reflection polarizer, a front retardation value Re satisfies 0 nm≤Re≤10 nm in a range of ±50 nm outside a reflection center wavelength, and an absolute value |Ret (50°)| of a retardation value Ret in a polar angle 50° direction satisfies |Ret (50°)|≤50 nm,
wherein the reflection polarizer includes a first light reflecting layer, a second light reflecting layer, and a third light reflecting layer, and
wherein, any one of the first light reflecting layer, the second light reflecting layer, and the third light reflecting layer is a blue reflection layer having a reflection center wavelength of 380 to 499 nm and having a peak of a reflectance of which a half-width is 100 nm or less, another is a green reflection layer having a reflection center wavelength of 500 to 599 nm and having a peak of a reflectance of which a half-width is 200 nm or less, and another is a red reflection layer having a reflection center wavelength of 600 to 750 nm and having a peak of a reflectance of which a half-width is 150 nm or less.

2. The optical element according to claim 1, further comprising:
a λ/4 plate on at least one surface of the reflection polarizer.

3. A liquid crystal display device comprising, at least:
the optical element according to claim 2;
a liquid crystal cell; and
a backlight unit.

* * * * *